United States Patent
Naito et al.

(10) Patent No.: US 6,654,732 B1
(45) Date of Patent: Nov. 25, 2003

(54) APPARATUS AND METHOD FOR ADJUSTING INTERACTION LEVEL, AND STORAGE MEDIUM FOR STORING PROGRAM THEREFOR

(75) Inventors: Hirohisa Naito, Kanagawa (JP); Yoshiharu Maeda, Kanagawa (JP); Minoru Sekiguchi, Kanagawa (JP); Kuniharu Takayama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/359,049

(22) Filed: Jul. 23, 1999

(30) Foreign Application Priority Data

Dec. 4, 1998 (JP) .......................... 10-345511

(51) Int. Cl.⁷ ............................................. G06F 17/00
(52) U.S. Cl. ............................. 706/45; 706/46; 706/47
(58) Field of Search ................. 706/45–47, 49

(56) References Cited

U.S. PATENT DOCUMENTS

| | | | |
|---|---|---|---|
| 4,168,608 A | | 9/1979 | Uram ........................... 60/773 |
| 4,625,081 A | * | 11/1986 | Lotito et al. .............. 379/88.26 |
| 4,768,482 A | | 9/1988 | Cheng et al. ................ 123/363 |
| 5,398,304 A | * | 3/1995 | Bauman et al. ................ 706/49 |
| 5,402,526 A | * | 3/1995 | Bauman et al. ................ 706/49 |
| 5,412,756 A | * | 5/1995 | Bauman et al. ................ 706/45 |
| 5,511,724 A | | 4/1996 | Freiberger et al. ......... 236/49.3 |

FOREIGN PATENT DOCUMENTS

| | | |
|---|---|---|
| EP | 0 444 629 A2 | 2/1991 |
| EP | 0 743 580 A1 | 3/1996 |
| JP | 8-221295 | 8/1996 |
| JP | 10-49492 | 2/1998 |

OTHER PUBLICATIONS

Automation Generation of Task–oriented Help, S. Pangoli; F. Paterno; Symposium on User Interface Software and technology, Proceedings of the 8th annual ACM symposium on User interface and thchnology (ACM1995) pp. 181–187.*

Distributed Artificial Intelligence: A Necessary Paradigm for Supervising Production Management Activities, Jean Pierre Laurent; Agnes Lanuese; Bernard Pierre Panet; Proceeding on the 2nd Intl.Conf. on Industrial, Engineering, Expert Systems, pps. 329–35.*

* cited by examiner

Primary Examiner—Paul P. Gordon
Assistant Examiner—Michael B. Holmes
(74) Attorney, Agent, or Firm—Staas & Halsey LLP

(57) ABSTRACT

An automation level selection unit automatically selects one automation level corresponding to a given trigger based on a situation, the prediction of performance, the detection of a user reaction, or the record of a user operation in the past. A level-based process control unit controls a predetermined process corresponding to the automation level selected by the automation level selection unit.

20 Claims, 24 Drawing Sheets

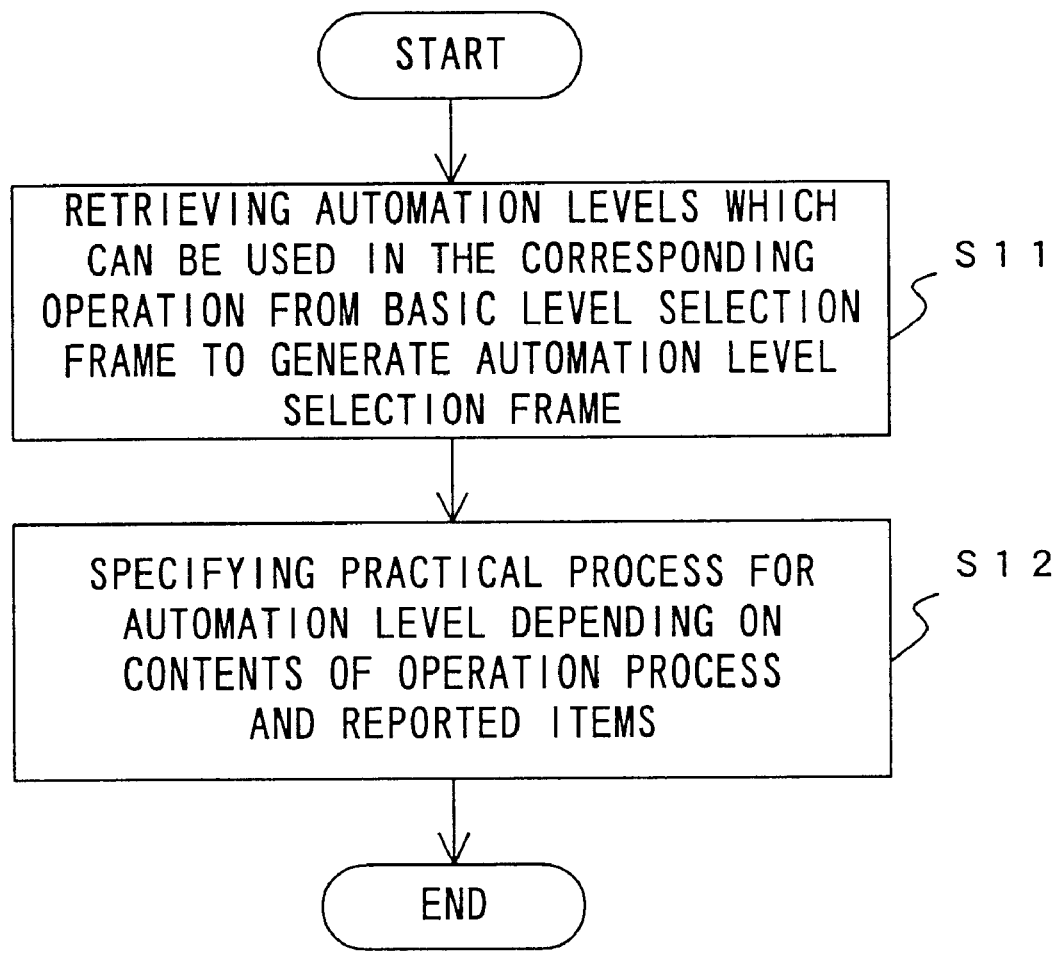
F I G. 3

| | BASIC LEVEL SELECTION FRAME |
|---|---|
| 1 | ALL PROCESSES ARE PERFORMED BY USER |
| 2 | SUBSTITUTE SUGGESTION IS PRESENTED |
| 3 | FEW SELECTED SUBSTITUTE SUGGESTIONS ARE PRESENTED |
| 4 | BEST SUGGESTION IS PRESENTED |
| 5 | BEST SUGGESTION IS PRESENTED WITH APPROVAL |
| 6 | TIME IS ALLOWED FOR CONSIDERATION WHETHER SUGGESTION IS ACCEPTED OR REFUSED |
| 7 | PROCESS IS AUTOMATICALLY PERFORMED, AND RESULT IS REPORTED AFTERWARDS |
| 8 | PROCESS IS AUTOMATICALLY PERFORMED, AND RESULT IS REPORTED AT REQUEST ONLY |
| 9 | PROCESS IS AUTOMATICALLY PERFORMED, AND RESULT IS REPORTED ONLY WHEN REQUIRED |
| 10 | PROCESS IS AUTOMATICALLY PERFORMED COMPLETELY |

F I G. 4 A

| | AUTOMATION LEVEL SELECTION FRAME |
|---|---|
| 1 | ALL PROCESSES ARE PERFORMED BY USER |
| 5 | BEST SUGGESTION IS PERFORMED WITH APPROVAL |
| 6 | TIME IS ALLOWED FOR CONSIDERATION WHETHER SUGGESTION IS ACCEPTED OR REFUSED |
| 7 | PROCESS IS AUTOMATICALLY PERFORMED, AND RESULT IS REPORTED AFTERWARDS |
| 8 | PROCESS IS AUTOMATICALLY PERFORMED, AND RESULT IS REPORTED AT REQUEST ONLY |
| 9 | PROCESS IS AUTOMATICALLY PERFORMED, AND RESULT IS REPORTED ONLY WHEN REQUIRED |
| 10 | PROCESS IS AUTOMATICALLY PERFORMED COMPLETELY |

F I G. 4 B

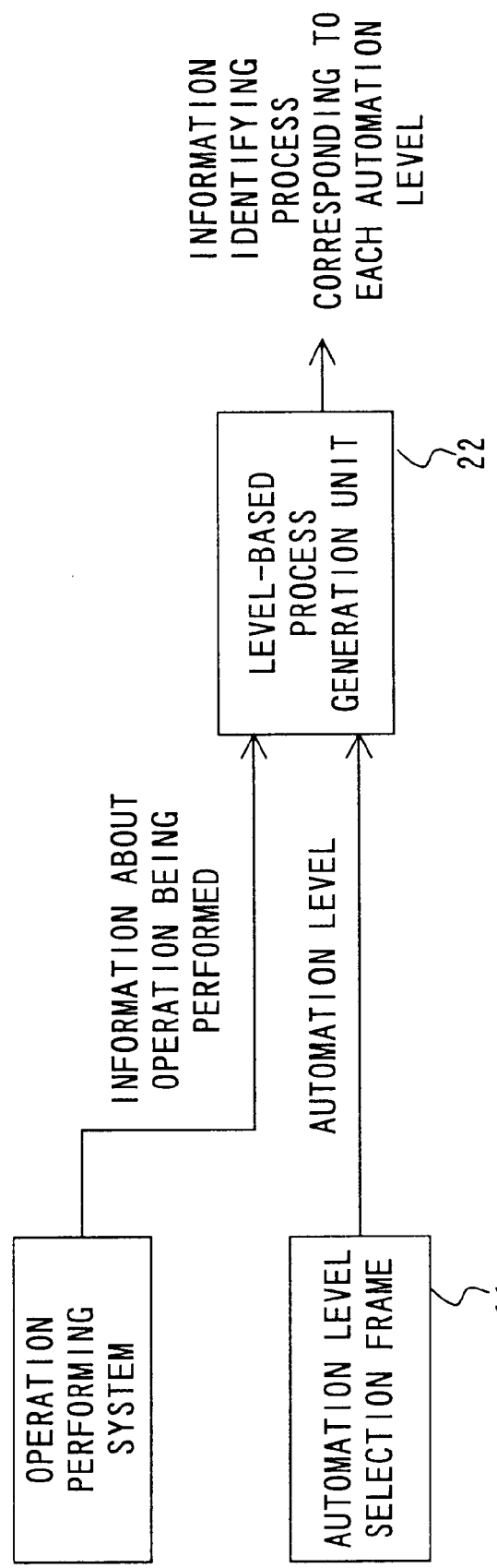
F I G. 5

| AUTOMATION LEVEL SELECTION FRAME | | LEVEL-BASED PROCESS |
|---|---|---|
| 1 | ALL PROCESS ARE PERFORMED BY USER | NO PROCESSES ARE PERFORMED |
| 5 | BEST SUGGESTION IS PERFORMED WITH APPROVAL | PROCESS A IS PRESENTED, AND IS PERFORMED IF APPROVED |
| 6 | TIME IS ALLOWED FOR CONSIDERING WHETHER SUGGESTION IS ACCEPTED OR REFUSED | PROCESS A IS PRESENTED, AND IS PERFORMED WHEN NO ANSWER OF APPROVAL OR REFUSAL IS RECEIVED |
| 7 | PROCESS IS AUTOMATICALLY PERFORMED, AND RESULT IS REPORTED AFTERWARDS | PROCESS A IS PERFORMED, AND THEN CONTENTS X OF REPORT ARE REPRESENTED |
| 8 | PROCESS IS AUTOMATICALLY PERFORMED, AND RESULT IS REPORTED AT REQUEST ONLY | PROCESS A IS PERFORMED, AND THEN CONTENTS X OF REPORT ARE REPRESENTED ON REQUEST |
| 9 | PROCESS IS AUTOMATICALLY PERFORMED, AND RESULT IS REPORTED ONLY WHEN REQUIRED | PROCESS A IS PERFORMED, AND THEN CONTENTS X OF REPORT ARE REPRESENTED WHEN THEY ARE DETERMINED TO BE REQUIRED |
| 10 | PROCESS IS AUTOMATICALLY PERFORMED COMPLETELY | PROCESS A IS PERFORMED |

F I G. 6 A

| AUTOMATION LEVEL SELECTION FRAME | | LEVEL-BASED PROCESS |
|---|---|---|
| 1 | ALL PROCESS ARE PERFORMED BY USER | NO PROCESSES ARE PERFORMED |
| 2 | A SUBSTITUTE SUGGESTION IS PRESENTED | PROCESSES A, B, AND C ARE PRESENTED |
| 3 | FEW SELECTED SUBSTITUTE SUGGESTIONS ARE PRESENTED | PROCESSES A AND C ARE PRESENTED |
| 4 | BEST SUGGESTION IS PRESENTED | PROCESS A IS PRESENTED |
| 5 | BEST SUGGESTION IS PRESENTED WITH APPROVAL | PROCESS A IS PRESENTED, AND IS PERFORMED IF APPROVED |
| 6 | TIME IS ALLOWED FOR CONSIDERING WHETHER SUGGESTION IS ACCEPTED OR REFUSED | PROCESS A IS PRESENTED, AND IS PERFORMED WHEN NO ANSWER OF APPROVAL OR REFUSAL IS RECEIVED |
| 7 | PROCESS IS AUTOMATICALLY PERFORMED, AND RESULT IS REPORTED AFTERWARDS | PROCESS A IS PERFORMED, AND THEN CONTENTS X OF REPORT ARE REPRESENTED |
| 8 | PROCESS IS AUTOMATICALLY PERFORMED, AND RESULT IS REPORTED AT REQUEST ONLY | PROCESS A IS PERFORMED, AND THEN CONTENTS X OF REPORT ARE REPRESENTED ON REQUEST |
| 9 | PROCESS IS AUTOMATICALLY PERFORMED, AND RESULT IS REPORTED ONLY WHEN REQUIRED | PROCESS A IS PERFORMED, AND THEN CONTENTS X OF REPORT ARE REPRESENTED WHEN THEY ARE DETERMINED TO BE REQUIRED |
| 10 | PROCESS IS AUTOMATICALLY PERFORMED COMPLETELY | PROCESS A IS PERFORMED |

F I G. 6 B

| AUTOMATION LEVEL SELECTION FRAME | | LEVEL- BASED PROCESS |
|---|---|---|
| 1 | ALL PROCESSES ARE PERFORMED BY USER | AUTHORITY FOR OPERATION IS PASSED TO USER. |
| 2 | A SUBSTITUTE SUGGESTION IS PRESENTED | ALL POSSIBLE DESTINATIONS ARE LISTED. USER SETS ACTUAL DESTINATIONS. |
| 3 | FEW SELECTED SUBSTITUTE SUGGESTIONS ARE PRESENTED | DESTINATIONS ARE AUTOMATICALLY LIMITED TO PRE-DETERMINED NUMBER DEPENDING ON TYPE OF USER, ENVIRONMENT, ETC., AND THEN ARE PRESENTED TO USER. USER SELECTS AND SET DESIRED DESTINATION FROM AMONG PRESENTED DESTINATIONS. |
| 4 | BEST SUGGESTION IS PRESENTED | BEST SUGGESTION OF SELECTED DESTINATIONS IS PRESENTED TO USER DEPENDING ON TYPE OF USER, ENVIRONMENT, ETC. IF USER ACCEPTS THE SUGGESTION, THEN USER SETS DESIRED DESTINATION FROM AMONG PRESENTED DESTINATIONS. |
| 5 | BEST SUGGESTION IS PRESENTED WITH APPROVAL | BEST SUGGESTION OF SELECTED DESTINATIONS IS PRESENTED TO USER DEPENDING ON TYPE OF USER, ENVIRONMENT, ETC., AND USER IS ASKED WHETHER OR NOT ANY OF DESTINATIONS ARE TO BE SET. IF USER ACCEPTS SUGGESTION, SYSTEM AUTOMATICALLY SETS ROUTE WITH THE DESTINATIONS. |
| 6 | TIME IS ALLOWED FOR CONSIDERING WHETHER SUGGESTION IS ACCEPTED OR REFUSED | BEST SUGGESTION OF DESTINATIONS IS DETERMINED, AND USER IS SUGGESTED, FOR EXAMPLE, 'IT IS ACCEPTABLE TO SET ROUTE WITH ... (SPECIFYING THE DETERMINED DESTINATION)?' USER IS ALLOWED TO TAKE PREDETERMINED TIME TO DETERMINE WHETHER SUGGESTION IS TO BE ACCEPTED OR REFUSED. IF USER ACCEPTS SUGGESTION, SUGGESTED ROUTE TO DESTINATION IS SET. IF USER DOES NOT ACCEPT SUGGESTION, THEN SUGGESTION IS DELETED. |
| 7 | PROCESS IS AUTOMATICALLY PERFORMED, AND RESULT IS REPORTED AFTERWARDS | BEST SUGGESTION OF DESTINATIONS IS DETERMINED, AND ROUTE IS AUTOMATICALLY SET WITH THE DESTINATIONS. THEN, THE REPORT THAT 'THE ROUTE HAS BEEN SET WITH···(SPECIFYING THE DETERMINED DESTINATION).' IS PRESENTED. |
| 8 | PROCESS IS AUTOMATICALLY PERFORMED, AND RESULT IS REPORTED AT REQUEST ONLY | BEST SUGGESTION OF DESTINATIONS IS DETERMINED, AND ROUTE IS AUTOMATICALLY SET WITH THE DESTINATIONS. REPORT IS ISSUED ON REQUEST. |
| 9 | PROCESS IS AUTOMATICALLY PERFORMED, AND RESULT IS REPORTED ONLY WHEN REQUIRED | BEST SUGGESTION OF DESTINATIONS IS DETERMINED, AND ROUTE IS AUTOMATICALLY SET WITH THE DESTINATIONS. THE REPORT IS ISSUED ONLY WHEN IT IS DETERMINED THAT THE REPORT IS REQUIRED. FOR EXAMPLE, IF A SUGGESTED PLACE IS COMMON TO THE USER, THAT IS, IF THE USER DAILY VISITS THE PLACE, NO REPORTS ARE ISSUED. HOWEVER, THE REPORT IS ISSUED IF THE PLACE IS NEW TO THE USER, THAT IS, IF PLACE IS, FOR EXAMPLE, NEVER VISITED BY USER. |
| 10 | PROCESS IS AUTOMATICALLY PERFORMED COMPLETELY | BEST SUGGESTION OF DESTINATIONS IS DETERMINED, AND ROUTE IS AUTOMATICALLY SET WITH THE DESTINATIONS. NO REPORTS ARE ISSUED TO USER. |

F I G. 7

| AUTOMATION LEVEL SELECTION FRAME | | LEVEL-BASED PROCESS |
|---|---|---|
| 1 | ALL PROCESSES ARE PERFORMED BY USER | USER IS NOTIFIED THAT USER'S FAVORITE SHOP HAS BEEN FOUND. REROUTING IS SET BY USER. |
| 5 | BEST SUGGESTION IS PERFORMED WITH APPROVAL | USER IS NOTIFIED THAT USER'S FAVORITE SHOP HAS BEEN FOUND. IF USER AGREES TO VISIT, THEN SYSTEM AUTOMATICALLY REROUTES WAY TO INCLUDE SHOP. |
| 6 | TIME IS ALLOWED FOR CONSIDERING WHETHER SUGGESTION IS ACCEPTED OR REFUSED | USER IS NOTIFIED THAT USER'S FAVORITE SHOP HAS BEEN FOUND, AND SYSTEM IS READY TO REROUTE WAY TO INCLUDE SHOP. PREDETERMINED TIME IS ALLOWED FOR CONSIDERING WHETHER SUGGESTION IS ACCEPTED OR REFUSED. IF USER ACCEPTS SUGGESTION, SYSTEM REROUTES WAY. IF USER REFUSES SUGGESTION, SYSTEM TAKES NO ACTION. |
| 7 | PROCESS IS AUTOMATICALLY PERFORMED, AND RESULT IS REPORTED AFTERWARDS | AFTER AUTOMATICALLY REROUTING WAY TO INCLUDE USER'S FAVORITE SHOP, SYSTEM ISSUES TO USER REPORT THAT REROUTING PROCESS HAS BEEN PERFORMED TO INCLUDE SHOP. |
| 8 | PROCESS IS AUTOMATICALLY PERFORMED, AND RESULT IS REPORTED AT REQUEST ONLY | AFTER AUTOMATICALLY REROUTING WAY TO INCLUDE USER'S FAVORITE SHOP. ONLY WHEN USER REQUESTS REPORT, SYSTEM INFORMS USER THAT USER'S FAVORITE SHOP HAS BEEN FOUND AND REROUTING PROCESS HAS BEEN PERFORMED TO INCLUDE SHOP. |
| 9 | PROCESS IS AUTOMATICALLY PERFORMED, AND RESULT IS REPORTED ONLY WHEN REQUIRED | AFTER AUTOMATICALLY REROUTING WAY TO INCLUDE USER'S FAVORITE SHOP, SYSTEM ISSUES TO USER REPORT THAT REROUTING PROCESS HAS BEEN PERFORMED TO INCLUDE SHOP ONLY WHEN SYSTEM DETERMINES THAT REPORT IS REQUIRED. |
| 10 | PROCESS IS AUTOMATICALLY PERFORMED COMPLETELY | AFTER AUTOMATICALLY REROUTING WAY TO INCLUDE USER'S FAVORITE SHOP, SYSTEM ISSUES NO REPORT TO USER. |

FIG. 9

| AUTOMATION LEVEL SELECTION FRAME | | LEVEL- BASED PROCESS |
|---|---|---|
| 11 | ALL PROCESSES ARE PERFORMED BY USER. | AUTHORITY FOR OPERATION IS PASSED TO USER. |
| 12 | USER IS PROMPTED TO MAKE SETTINGS FOR RESPECTIVE PROCESSES. | USER IS PROMPTED TO SET DESTINATION, AND THEN SET PLACE TO BE INCLUDED IN ROUTE. THUS, ALL STEPS OF SETTING NECESSARY ITEMS ARE SEQUENTIALLY PRESENTED TO AND SET BY USER. |
| 13 | USER IS PROMPTED TO MAKE SETTING, AND OTHER SETTINGS ARE AUTOMATICALLY MADE BY SYSTEM. | USER IS PROMPTED TO SET DESTINATION, AND THEN PLACE TO BE INCLUDED IN ROUTE IS AUTOMATICALLY SET BY SYSTEM. |
| 14 | SETTING IS AUTOMATICALLY MADE WITH USER'S APPROVAL. | SYSTEM AUTOMATICALLY SETS DESTINATION AND PLACE TO BE INCLUDED IN ROUTE, AND THEN OBTAINS USER'S APPROVAL. |
| 15 | PROCESS IS AUTOMATICALLY PERFORMED COMPLETELY | SYSTEM AUTOMATICALLY SETS DESTINATION AND PLACE TO BE INCLUDED IN ROUTE. |

FIG. 10

| AUTOMATION LEVEL SELECTION FRAME | | LEVEL- BASED PROCESS |
|---|---|---|
| 11 | ALL PROCESSES ARE PERFORMED BY USER. | AUTHORITY FOR OPERATION IS PASSED TO USER. |
| 12 | USER IS PROMPTED TO MAKE SETTINGS FOR RESPECTIVE PROCESSES. | USER IS PROMPTED TO SET NECESSARY PARAMETERS SUCH AS SEARCHING CONDITION, ETC. IN SEARCHING ROUTE, AND ALL STEPS OF SETTING NECESSARY ITEMS ARE SEQUENTIALLY PRESENTED TO AND SET BY USER. |
| 13 | USER IS PROMPTED TO MAKE SETTING, AND OTHER SETTINGS ARE AUTOMATICALLY MADE BY SYSTEM. | SOME OF PARAMETERS NECESSARY IN SEARCHING ROUTE SUCH AS SEARCHING CONDITION, ETC. ARE AUTOMATICALLY SET BY SYSTEM, AND OTHERS, AS NECESSARY, ARE PRESENTED TO AND SET BY USER. |
| 14 | SETTING IS AUTOMATICALLY MADE WITH USER'S APPROVAL. | BEST SUGGESTION OF PARAMETERS NECESSARY IN SEARCHING ROUTE SUCH AS SEARCHING CONDITION, ETC. IS PRESENTED TO USER TO OBTAIN USER'S APPROVAL. |
| 15 | PROCESS IS AUTOMATICALLY PERFORMED COMPLETELY | SYSTEM AUTOMATICALLY SELECTS BEST SUGGESTION OF, FOR EXAMPLE, SEARCHING CONDITION, ETC. REQUIRED TO SEARCH ROUTE. |

FIG. 11

```
IF USER IS MAN
    THEN AUTOMATION LEVEL = 10 /*DISPLAYING COMPLETELY AUTOMATIC*/

ELSE IF USER IS WOMAN
    THEN AUTOMATION LEVEL = 5
         /*DISPLAYING AFTER ASKING IF DATA IS TO BE DISPLAYED*/
```

F I G. 1 2 A

```
IF USER'S FAVORITE SOFTWARE
    THEN AUTOMATION LEVEL = 5
         /*USER IS INFORMED, SOFTWARE IS INSTALLED WITH APPROVAL*/

ELSE IF BUG-FIX
    THEN AUTOMATION LEVEL = 7
         /*AUTOMATICALLY INSTALLED, AND REPORT ISSUED AFTERWARDS*/
```

F I G. 1 2 B

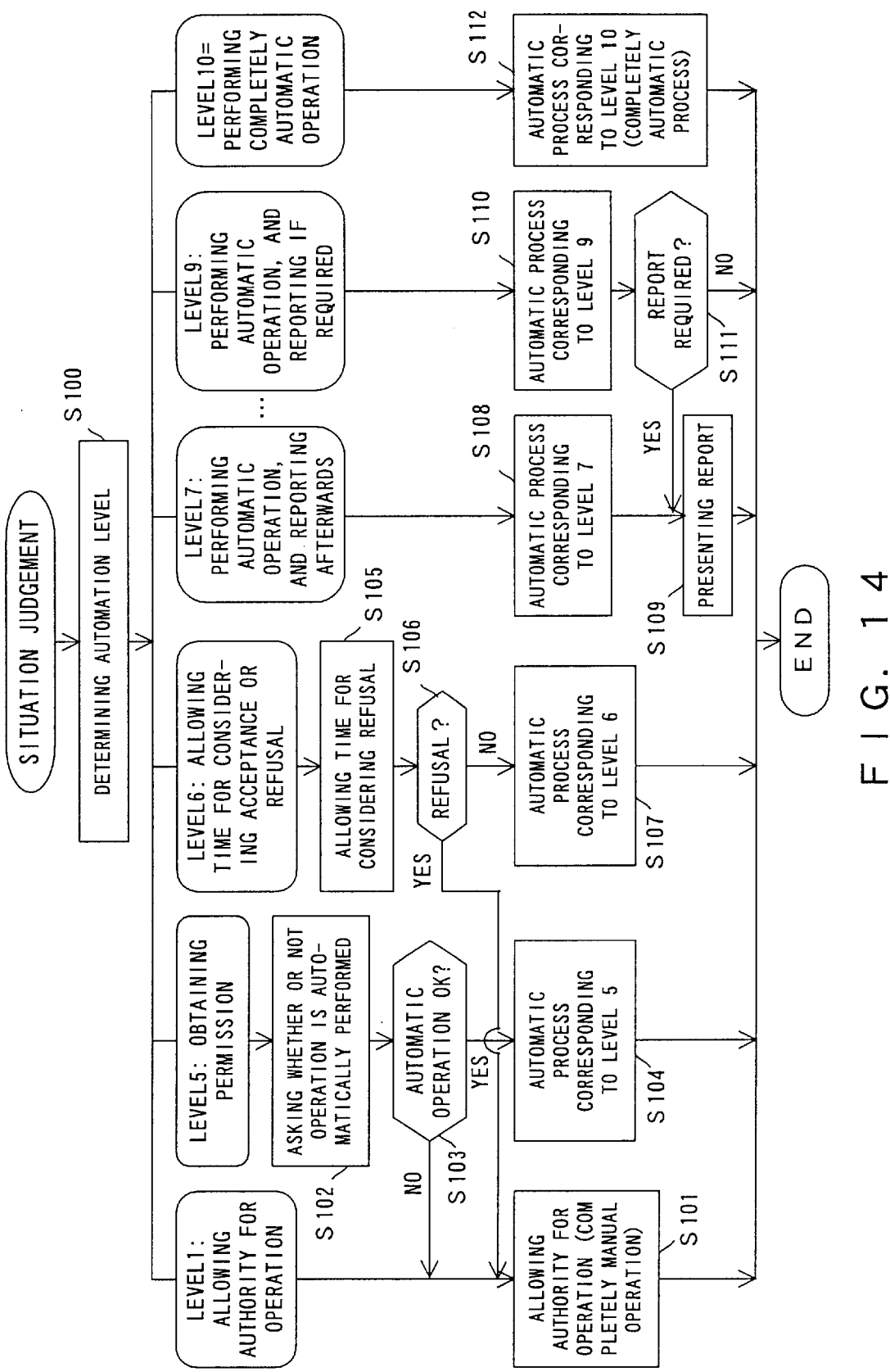
F I G. 14

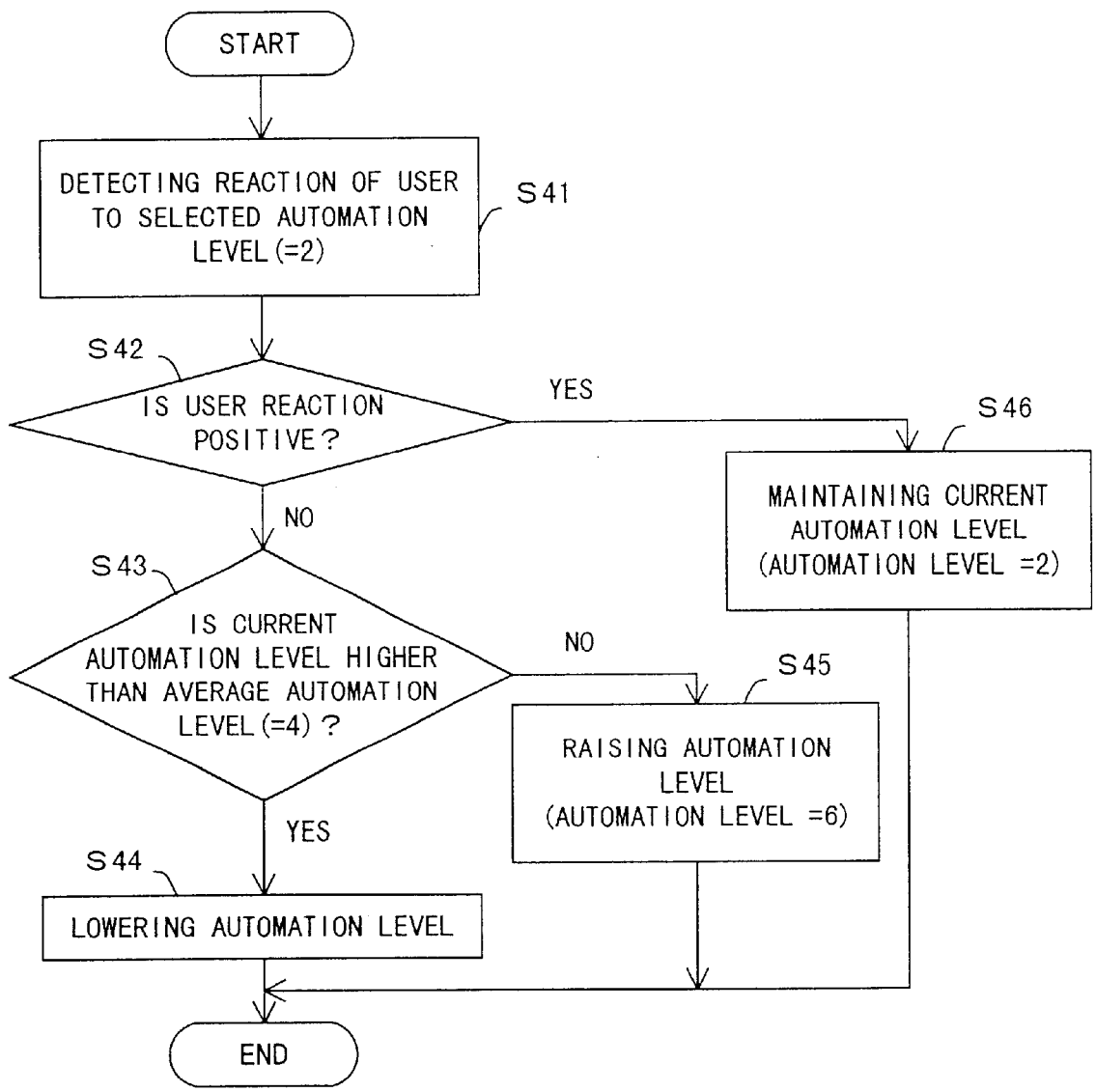
F I G. 1 6

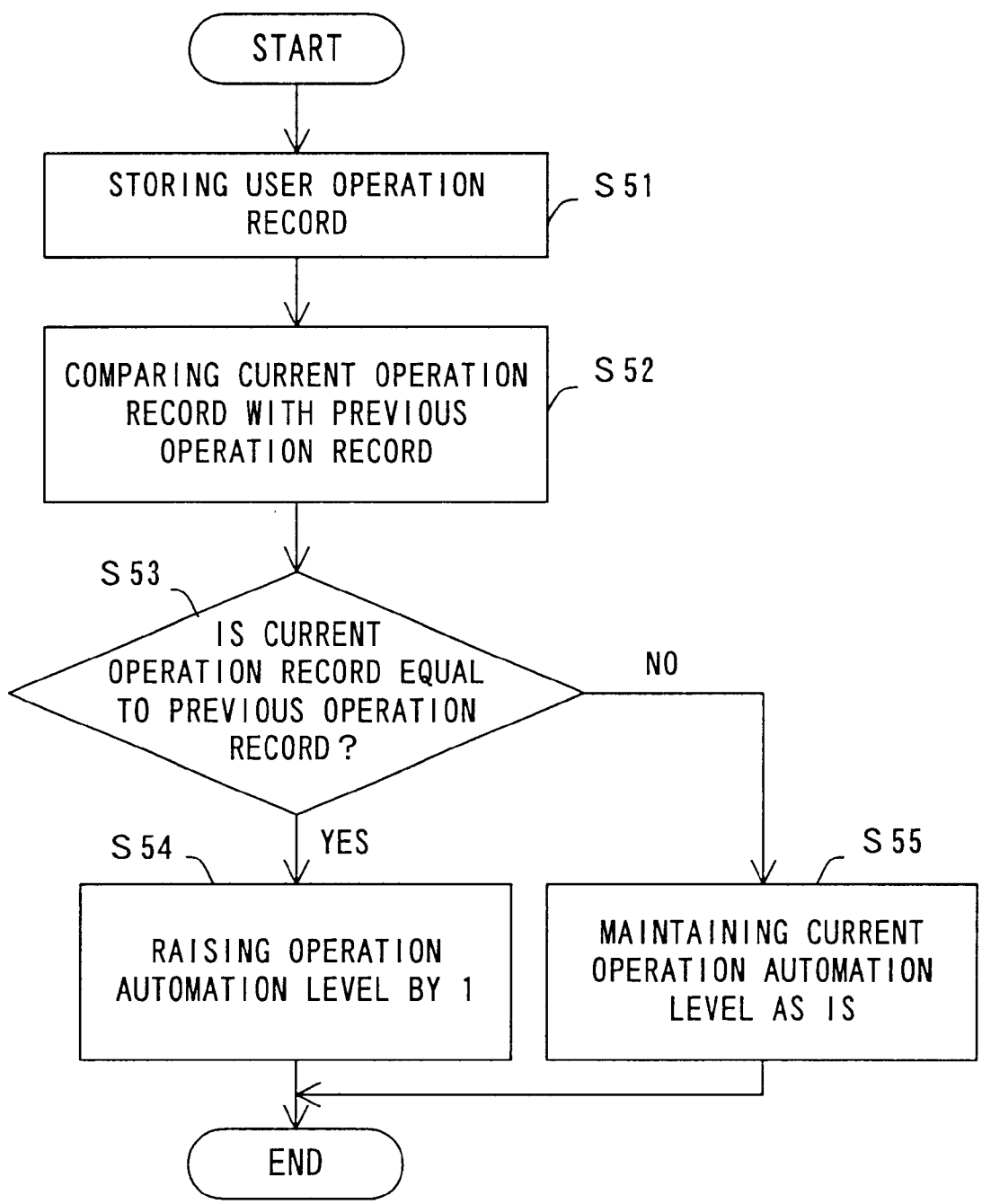
F I G. 1 7

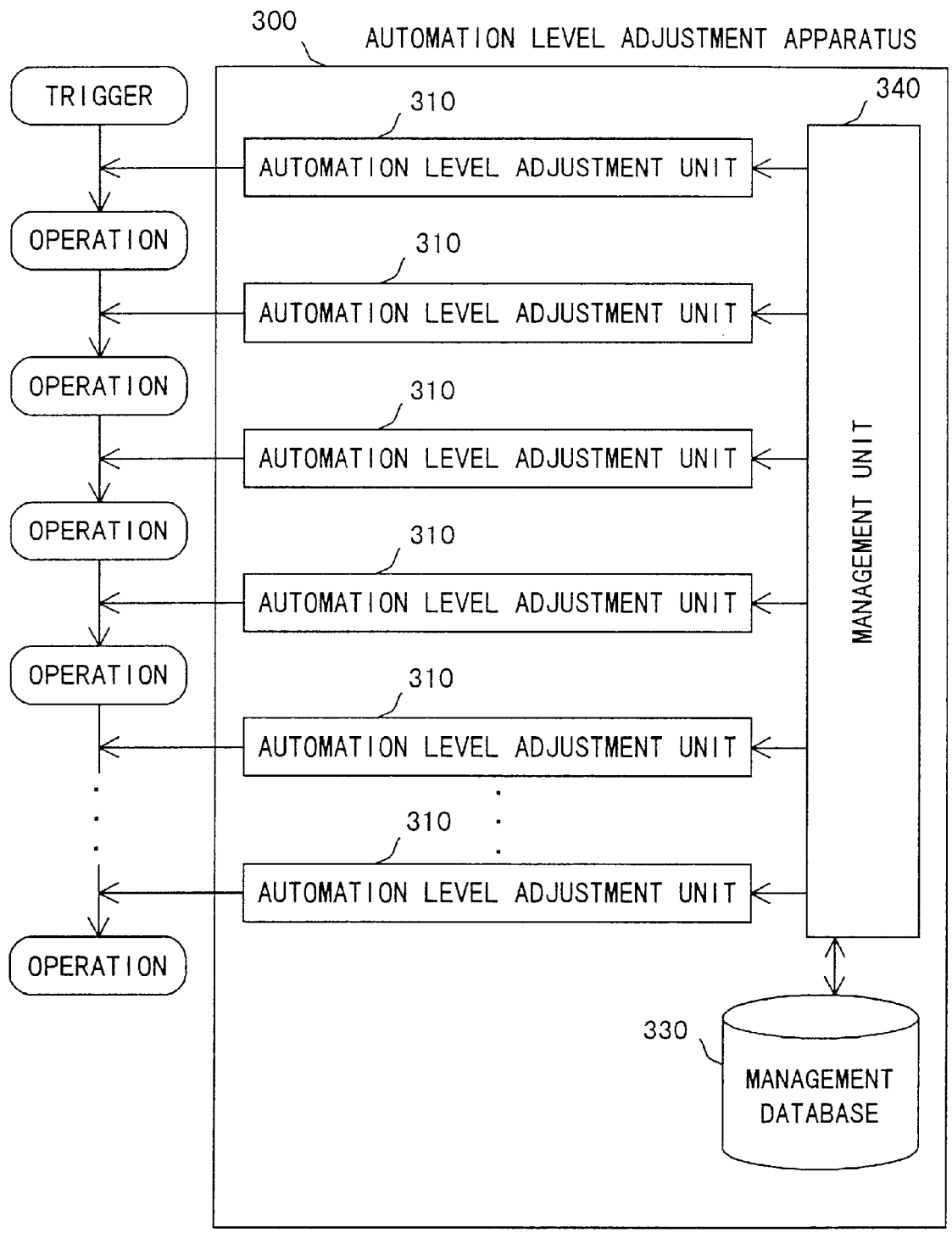
F I G. 19

| | AUTOMATION LEVEL SELECTION FRAME | LEVEL-BASED PROCESS |
|---|---|---|
| 1 | ALL PROCESSES ARE PERFORMED BY USER | AUTHORITY FOR OPERATION IS ASSIGNED TO USER. |
| 2 | A SUBSTITUTE SUGGESTION IS PRESENTED | PLURALITY OF SELECTION ITEMS SUCH AS 'USING ANYWAY', 'READING FIRST', 'INTERACTION FOR USAGE', 'VIEWING DEMONSTRATION', ETC. |
| 3 | FEW SELECTED SUBSTITUTE SUGGESTIONS ARE PRESENTED | SOME SELECTION ITEMS ARE SELECTED AND PRESENTED CORRESPONDING TO SKILL LEVEL OF USER DEPENDING ON TYPE OF USER, ENVIRONMENT, ETC. |
| 4 | BEST SUGGESTION IS PRESENTED | BEST SUGGESTION 'VIEWING DEMONSTRATION' IS PRESENTED CORRESPONDING TO SKILL LEVEL OF USER DEPENDING ON TYPE OF USER, ENVIRONMENT, ETC. |
| 5 | BEST SUGGESTION IS PRESENTED WITH APPROVAL | USER IS ASKED WHETHER OR NOT BEST SUGGESTION 'VIEWING DEMONSTRATION' IS PERFORMED DEPENDING ON TYPE OF USER, ENVIRONMENT, ETC. IF USER ACCEPTS SUGGESTION, SYSTEM AUTOMATICALLY PERFORMS BEST SUGGESTION. |
| 6 | TIME IS ALLOWED FOR CONSIDERING WHETHER SUGGESTION IS ACCEPTED OR REFUSED | DEMONSTRATION FILE IS AUTOMATICALLY READ, <DEMONSTRATION IS STARTING. OK?> IS PRESENTED, AND USER IS ALLOWED PREDETERMINED TIME FOR ACCEPTANCE OR REFUSAL. IF USER APPROVES, DEMONSTRATION IS STARTED. WITHOUT USER'S APPROVAL, THE SUGGESTION IS STOPPED. |
| 7 | PROCESS IS AUTOMATICALLY PERFORMED, AND RESULT IS REPORTED AFTERWARDS | DEMONSTRATION FILE IS AUTOMATICALLY READ TO START DEMONSTRATION. REPORT 'DEMONSTRATION WAS PERFORMED.' IS ISSUED LATER. |
| 8 | PROCESS IS AUTOMATICALLY PERFORMED, AND RESULT IS REPORTED AT REQUEST ONLY | DEMONSTRATION FILE IS AUTOMATICALLY READ TO START DEMONSTRATION. REPORT IS ISSUED ONLY AT REQUEST. |
| 9 | PROCESS IS AUTOMATICALLY PERFORMED, AND RESULT IS REPORTED ONLY WHEN REQUIRED | DEMONSTRATION FILE IS AUTOMATICALLY READ TO START DEMONSTRATION. REPORT IS ISSUED ONLY WHEN IT IS REQUIRED. THAT IS, REPORT IS NOT ISSUED WHEN OBJECT IS EASILY RECOGNIZED, BUT IS ISSUED ONLY WHEN IT CANNOT BE RECOGNIZED WITHOUT EXPLANATION. |
| 10 | PROCESS IS AUTOMATICALLY PERFORMED COMPLETELY | DEMONSTRATION FILE IS AUTOMATICALLY READ TO START DEMONSTRATION. NO REPORTS ARE ISSUED TO USER. |

FIG. 21

| AUTOMATION LEVEL SELECTION FRAME | | LEVEL- BASED PROCESS |
|---|---|---|
| 1 | ALL PROCESSES ARE PERFORMED BY USER | PROGRAM IS NOT AUTOMATICALLY RECORDED. |
| 5 | BEST SUGGESTION IS PRESENTED WITH APPROVAL | USER'S FAVORITE PROGRAM IS RECORDED AFTER ASKING EACH TIME USER, 'IS THE PROGRAM ... TO BE RECORDED?', AND OBTAINING POSITIVE ANSWER FROM USER. |
| 6 | TIME IS ALLOWED FOR CONSIDERING WHETHER SUGGESTION IS ACCEPTED OR REFUSED | USER'S FAVORITE PROGRAM IS RECORDED AFTER ASKING EACH TIME USER, 'IS PROGRAM ...TO BE RECORDED?', ALLOWING PREDETERMINED TIME FOR CONSIDERING APPROVAL OR REFUSAL, AND OBTAINING POSITIVE ANSWER FROM USER. |
| 7 | PROCESS IS AUTOMATICALLY PERFORMED, AND RESULT IS REPORTED AFTERWARDS | SYSTEM DETERMINES TO AUTOMATICALLY RECORD PROGRAM, AND THEN REPORTS, 'PROGRAM ... WAS RECORDED.' |
| 8 | PROCESS IS AUTOMATICALLY PERFORMED, AND RESULT IS REPORTED AT REQUEST ONLY | SYSTEM DETERMINES TO AUTOMATICALLY RECORD PROGRAM,. AND THEN REPORT, 'PROGRAM ... WAS RECORDED.' WHEN USER ASKS IF ANY PROGRAM HAS BEEN RECORDED. |
| 9 | PROCESS IS AUTOMATICALLY PERFORMED, AND RESULT IS REPORTED ONLY WHEN REQUIRED | SYSTEM DETERMINES TO AUTOMATICALLY RECORD PROGRAM, AND THEN REPORTS, 'PROGRAM ... WAS RECORDED.' ONLY WHEN IT DETERMINES THAT IT IS NECESSARY TO REPORT TO USER THAT PROGRAM WAS RECORDED. |
| 10 | PROCESS IS AUTOMATICALLY PERFORMED COMPLETELY | PROGRAM IS AUTOMATICALLY RECORDED WITHOUT ANY REPORT TO USER. |

FIG. 22

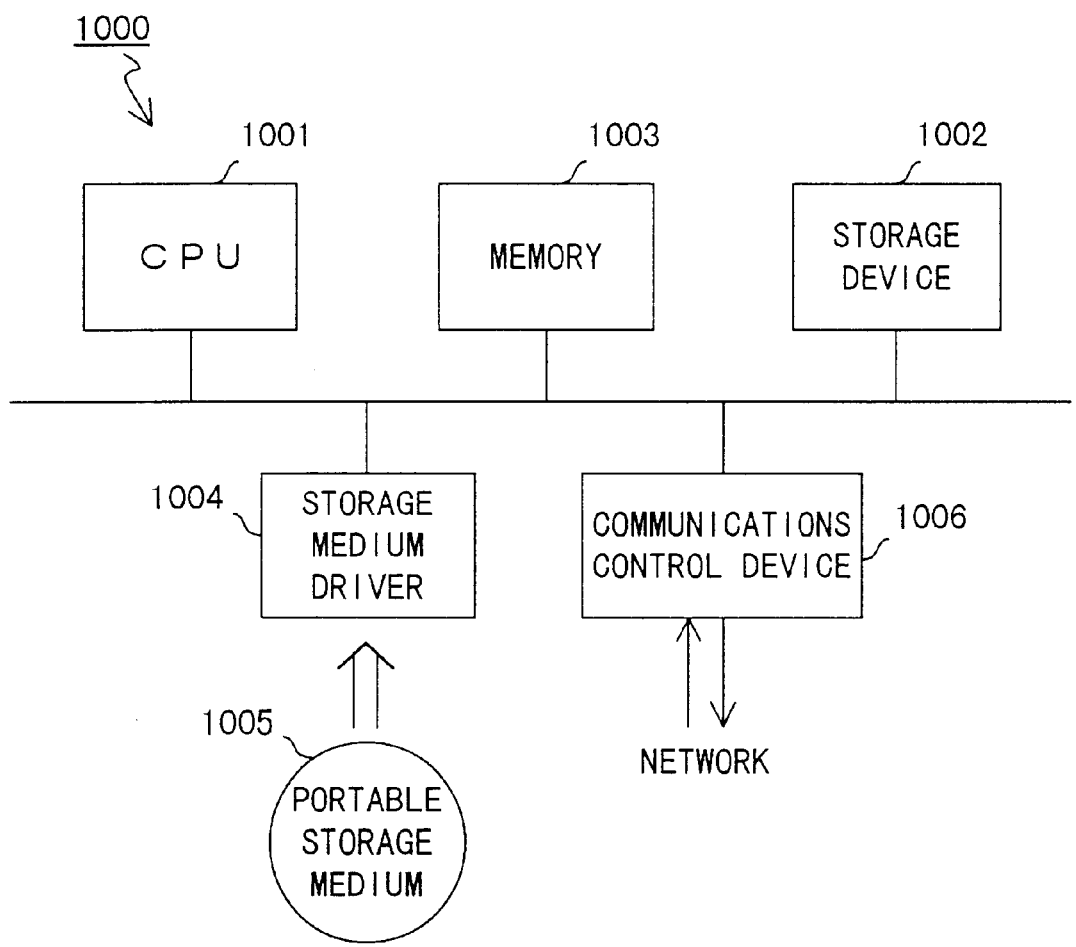
F I G. 2 3

APPARATUS AND METHOD FOR ADJUSTING INTERACTION LEVEL, AND STORAGE MEDIUM FOR STORING PROGRAM THEREFOR

BACKGROUND OF THE INVENTION

1. Field of the Invention

The present invention relates to an apparatus and method for adjusting an automation level of an operation performed by a system (including a device and a machine) for performing the operation corresponding to a given trigger.

A "trigger" is a provocation to cause an operation or an action. For example, in a car navigation system, an example of a trigger is "a user getting on a car", and an example of an operation corresponding to the trigger is "setting a route", etc. In a washing machine, an example of a trigger is "clothes being put into the washing machine", and an example of the operation corresponding to the trigger is "setting a washing pattern (for the amount of water, the rinsing time, etc.)". An "automation level" refers to an index about to what extent the system automatically performs an operation, or to what extent the user performs a process for the operation. The case in which the user manually performs the entire operation is also regarded as one of the automation levels.

2. Description of the Related Art

A system (including a device, a machine, etc.) for performing a part or all of operations conventionally performed by human being has been developed in various fields.

In many cases, such a system allows a user to select an "automatic operation" or a "manual operation". For example, many washing machines. have selection buttons which allow a user to select "automatic" or "manual". In addition, the setting menu to be accessed from the main menu of a computer system has, in many cases, the function of allowing a user to select a manual process or an automatic process.

However, the existing system does not automatically select the manual/automatic operation, but the user has to select the manual or automatic operation basically. In addition, when a process sequence containing a series of operations is performed, a conventional system cannot automatically set each of the operations for a manual or an automatic operation.

However, when an operation is automated, various levels can be set depending on the desired operation as to what extent the operation should be automated, or to what extent a user processes the operation. As a method of classifying the operation automation levels, for example, "Sheridan, T.B.: Telerobotics, Automation, and Human Supervisory Control MIT press (1992)" has been suggested.

However, the method of classifying the automation levels suggested by the above described document indicates only the extent of the automation level of the conventional system, and does not disclose the technology of switching the operation automation levels based on the classifying method. That is, the conventional system can only be set as to whether the system can be operated manually or completely automatically, but cannot be set for various automation levels based on the automation levels prepared in many steps from a manual operation to a complete automatic operation. In addition, there has no system which can be adjusted for general automation level on a series of operations.

When a system is complicated, it is difficult for a user to manually operate the entire system. Therefore, the system is designed to be automatically operated if it is possible. Thus, the load on the user can be reduced to some extent, and a convenient automatic system is appreciated. However, if the automation overruns, there may occur the case in which a user-desired operation cannot be performed, and the user may feel inconvenience. Furthermore, when the user requests the system to perform an operation such that the user request can be satisfied, a high-level automation system may require a number of automation release instructions, thereby assigning a more complicated operation to satisfy the user's request than a complete manual system in which all operations are performed by the user.

Furthermore, the optimum automation level of an operation performed by the system depends on each user. For example, some users wants to perform all operations by themselves while others want the system to autonomously perform all operations. On the other hand, some users want to perform a specific operation in a process by themselves, but request other operations to be automatically performed by the system. In addition, some users want to change an automation level in accordance with circumstances or situations.

However, few conventional systems can be set for a large number of automation levels. Although it can be set for a plurality of automation levels, it is necessary to set them with a very complicated operation steps. Furthermore, even if one of the plurality of operations can be set for an automation level, the automation level for a plurality of operations cannot be collectively adjusted.

In addition, the system is not designed for each user, but commonly for a number of users. Therefore, the system cannot be fixedly designed for convenience of a specific user. As a result, it may be necessary for a system to automatically operate to some extent so that the system can be efficiently operated by general users under general conditions.

SUMMARY OF THE INVENTION

The present invention aims at providing an apparatus and method for automatically adjusting the automation level in a system for performing an operation according to a given trigger. The above described system can interactively or automatically perform its operations through an interactive process with a user or in a manual operation.

The automation level adjustment apparatus for use in a system which performs an operation according to a predetermined trigger is designed to adjust the automation level indicating to what extent the system is automated in performing the operation. The apparatus includes a selection unit which automatically selects an automation level based on predetermined conditions from among a plurality of available automation levels; and a control unit which performs a process corresponding to the automation level selected by the selection unit.

The above described predetermined conditions include one or more among the situation relating to the system, the performance of the system or the user, the response of the user when an operation is performed by the system, and the participation of the user when the operation is performed by the system.

According to the present invention, since the automation level of the operation performed by the system is automatically determined without the operation of the user, an interface more accessible by the user can be provided, thereby reducing the load onto the user when using the system, etc.

BRIEF DESCRIPTION OF THE DRAWINGS

FIG. 3 is a flowchart of an automation level generating process;

FIG. 4A shows an example of a basic level selection frame;

FIG. 4B shows an example of an automation level selection frame;

FIG. 5 shows the function of the level-based process generation unit;

FIGS. 6A and 6B show examples of assigning a process for each automation level;

FIG. 7 shows a practical example (1) of the level-based process set in the automation level selection frame;

FIGS. 9 through 11 show practical examples (2 through 4) of the level-based process set in the automation level selection frame;

FIGS. 12A and 12B show an example of the rule described in the knowledge base;

FIG. 14 is a flowchart of the process of the level-based process control unit;

FIG. 16 is a flowchart showing the process of determining an automation level according to user response information;

FIG. 17 is a flowchart showing the process of determining an automation level according to record of the user operation;

FIGS. 18 and 19 are block diagrams showing the automation level adjustment apparatus provided with a management unit;

FIG. 21 shows an example of an automation level and a process assigned corresponding to the level when the present invention is applied to a computer;

FIG. 22 shows an example of an automation level and a process assigned corresponding to the level when the present invention is applied to a video recorder;

FIG. 23 is a block diagram of a computer to which the present invention is applied.

DESCRIPTION OF THE PREFERRED EMBODIMENTS

Figure 1:
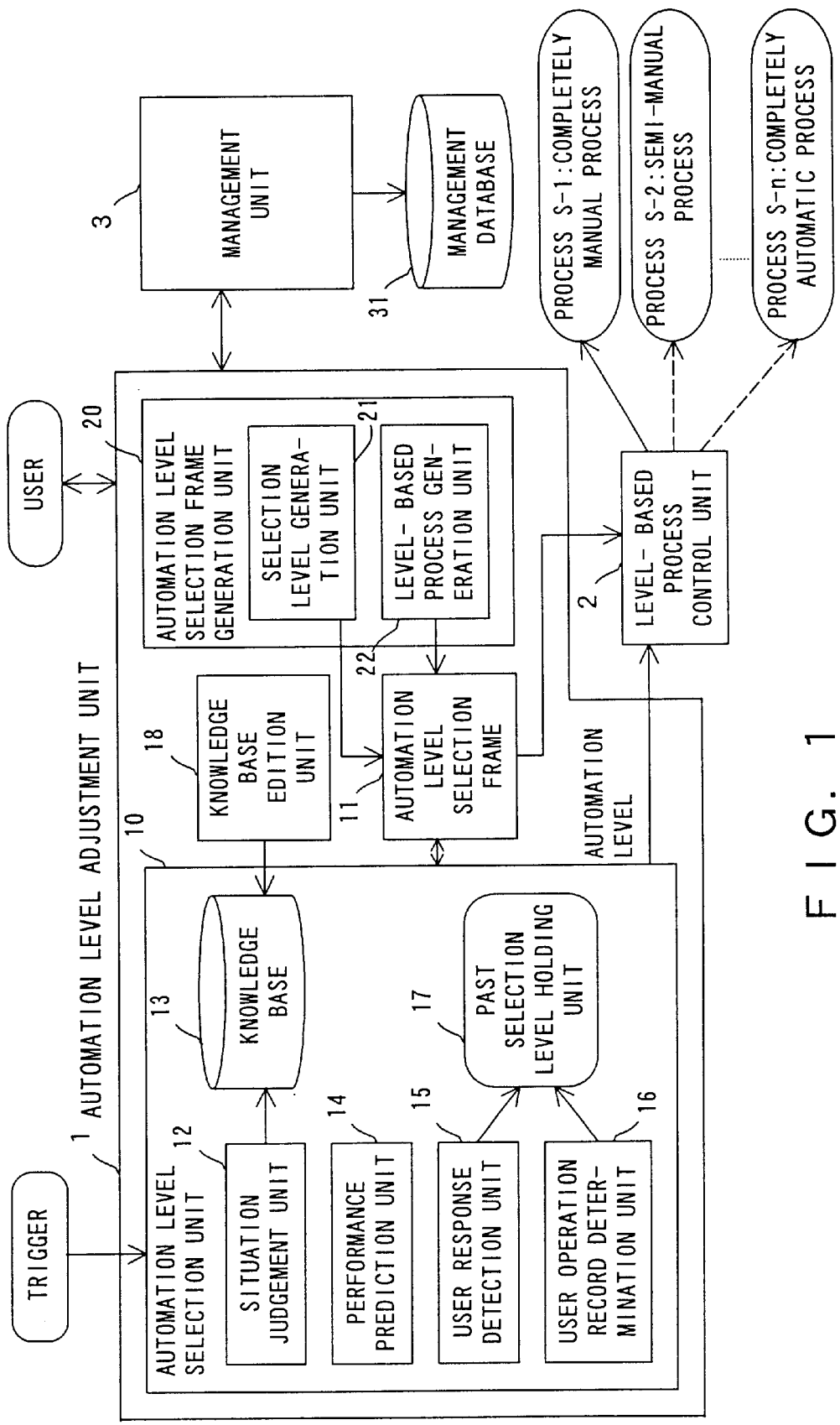
FIG. 1 is a block diagram of an embodiment of the automation level adjustment apparatus according to the present invention.
Figure 2A:
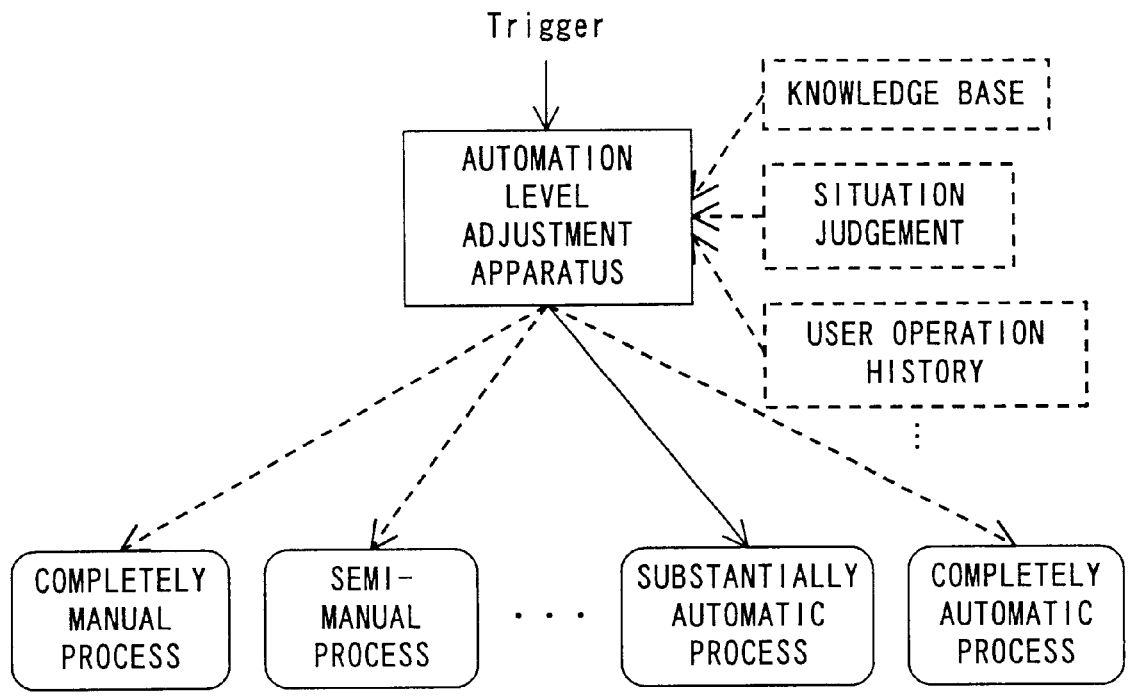
FIGS. 2A and 2B show the difference between the operation of the present invention and the operation of the conventional technology.
Figure 2B:
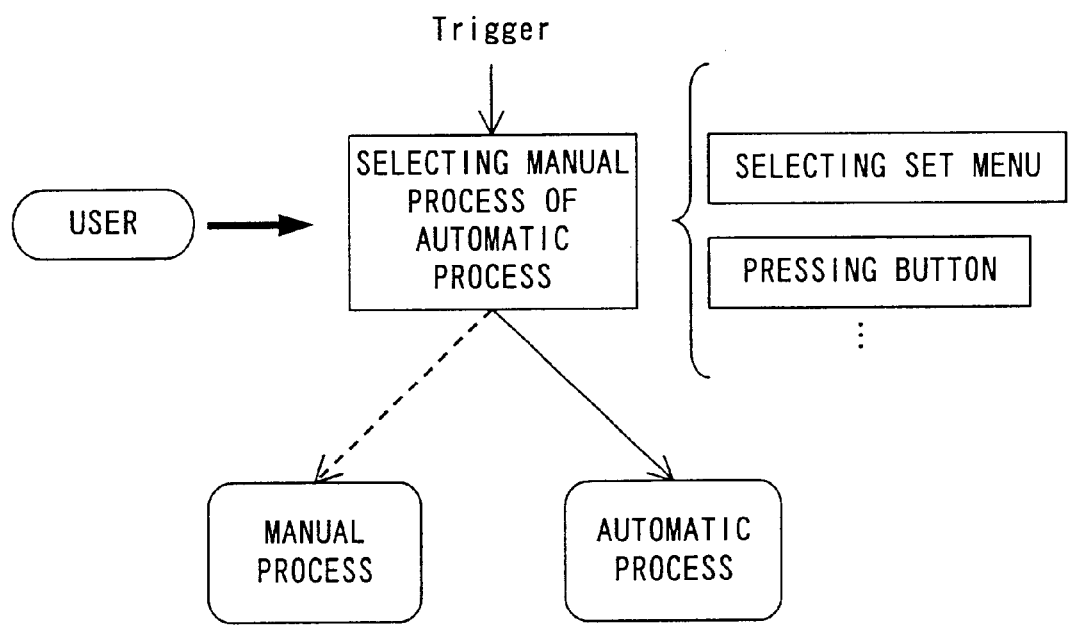

FIG. 1 is a block diagram of the automation level adjustment apparatus according to the present invention. This apparatus is provided for the system (hereinafter referred to as an "operation performing system") for performing an operation in response to a predetermined trigger. FIGS. 2A and 2B show the difference in method between the conventional technology and the present invention.

According to the present invention, when the system performs an operation in response to a predetermined trigger, one of a plurality of automation levels from the completely manual process to the completely automatic process is automatically selected, and the system performs the process corresponding to the selected automation level.

In the conventional technology, the user selects the manual process or the automatic process for the system operation as shown in FIG. 2B. The selection is made by, for example, using a menu screen, pressing the button for selection of an operation mode, etc. Furthermore, in the conventional technology, the selection can be made only by selecting one of the manual process or the automatic process, and cannot be made in detail for various automation levels.

On the other hand, when a predetermined trigger is received as shown in FIG. 2A, the automation level adjustment apparatus can select an appropriate automation level from among a plurality of automation levels such as a "completely manual level", a "almost automatic process", . . . , a "completely automatic process", etc. according to various information such as the information stored in the knowledge base, the information obtained through situation judgement, a user operation history, etc. The apparatus then instructs the system to perform a process corresponding to the selected automation level. Thus, according to the present invention, the optimum automation level can be selected without a user, and the system performs the process corresponding to the automation level. The automation levels include a "completely manual process".

Thus, the user has to select an automation level and set it on the system according to the conventional technology. On the other hand, according to the present invention, the automation level can be determined using various parameters, thereby automatically selecting the optimum automation level without user intervention.

The automation level adjustment apparatus according to the present invention comprises an automation level adjustment unit 1 for automatically switching an automation level when an operation is performed; a level-based process control unit 2 for controlling a process corresponding to each automation level; and a management unit 3 for managing the automation level adjustment unit 1. FIG. 1 shows only one automation level adjustment unit 1. However, the automation level adjustment apparatus can comprise a plurality of automation level adjustment units 1. In this case, the management unit 3 manages the plurality of automation level adjustment units 1.

The automation level adjustment unit 1 comprises an automation level selection unit 10 for selecting an automation level for an operation corresponding to a predetermined trigger performed by the operation performing system, when the predetermined trigger is assigned to the operation performing system; and an automation level selection frame generation unit 20 for generating an automation level selection frame 11. The automation level selection frame 11 is described later in detail, but stores information about an automation level of an operation performed by the operation performing system.

A situation judgement unit 12 selects an automation level from the automation level selection frame 11 based on the situation of user or the operation performing system. At this time, the situation judgement unit 12 refers to a knowledge base 13 as necessary. The knowledge base 13 stores knowledge such as rules, etc. used when an automation level is adaptively selected based on the situation.

A knowledge base edition unit 18 inputs knowledge to the knowledge base 13 at an instruction from the user, and edits the knowledge base 13. In addition, the knowledge base edition unit 18 analyzes the record or history of the operations performed by the user, obtains necessary knowledge from the knowledge base 13, or amends the knowledge base 13. Furthermore, when similar automation levels are repeatedly selected with a specific relationship between a trigger and an operation, the knowledge base edition unit 18 amends the knowledge base 13 such that a higher automation level can be selected.

When an operation is performed, a performance prediction unit 14 measures the performance of the user or the system, or predicts the performance, and selects an automation level from the automation level selection frame 11 based on the measurement or prediction result.

Based on the reaction of the user when an operation is performed at a certain automation level, a user response detection unit 15 determines an automation level to be selected next time an operation is performed.

A user operation record determination unit 16 records operation information about how the user relates to the operation performed at a specific automation level, and determines according to the operation information an automation level to be selected when the operation is next performed. A past selection level holding unit 17 stores information about which automation levels have been selected in the past.

The automation level selection frame generation unit 20 comprises a selection level generation unit 21 and a level-based process generation unit 22. The selection level generation unit 21 extracts one or more automation levels applicable in the corresponding operation from a plurality of prepared basic automation levels, and generates the automation level selection frame 11 based on the selected automation levels. The level-based process generation unit 22 assigns an actual process to each automation level of the automation level selection frame 11. "Assigning a process to an automation level" refers to linking an automation level and a corresponding program describing the process so that the corresponding program can be called when the automation level is selected.

The management unit 3 manages a plurality of automation level adjustment units 1 provided for each operation, when an automation level is set for each operation in an operation sequence comprising a plurality of operations. In addition, when there are a plurality of automation level adjustment units 1, the management unit 3 collectively manages the automation levels selected by the plurality of automation level adjustment units 1. Practically, the management unit 3 commonly or individually assigns to each of the automation level adjustment units 1 the automation level selection frame 11 used by each of the automation level adjustment units 1 in adjusting an automation level. In addition, the management unit 3 commonly or individually assigns the automation level selection frame 11 to each operation of a series of processes.

A program used to realize each of the above described processes by a computer can be stored in an appropriate storage medium such as a computer-readable portable medium memory, a semiconductor memory, a hard disk, etc.

Then, as an embodiment of the present invention, an example of applying the automation level adjustment apparatus shown in FIG. 1 to a car navigation system is described below.

1. Automation Level Selection Frame Generation Unit

The automation level selection frame generation unit 20 comprises a selection level generation unit 21 and a level-based process generation unit 22. The selection level generation unit 21 selects a plurality of automation levels applicable to an operation from a prepared basic automation level frame (hereinafter referred to as a "basic level selection frame"), and generates the automation level selection frame 11. It is assumed that the relationship between the operation performed by the operation performing system and the automation level applicable to the operation is predetermined. The level-based process generation unit 22 assigns an actual process corresponding to each of the automation levels set in the automation level selection frame 11. A process corresponding to each automation level depends on the operation performed by the operation performing system.

The flow of the automation level generating process performed by the automation level selection frame generation unit 20 is described below by referring to the flowchart shown in FIG. 3. First, when the selection level generation unit 21 recognizes the operation to be performed by the operation performing system, it retrieves the automation levels available when the operation is performed from the basic level selection frame, and generates the automation level selection frame 11 (step S11).

FIGS. 4A and 4B show examples of a basic level selection frame and an automation level selection frame. The basic level selection frame shown in FIG. 4A is a list of automation levels for use in generating the automation level selection frame 11. For example, the following predetermined automation levels from 1 to 10 are listed.

level 1: All process are performed by a user.

level 2: A substitute suggestion is presented.

level 3: A few selected substitute suggestions are presented.

level 4: The best suggestion is presented. level 5: The best suggestion is presented with approval.

level 6: Time is allowed for consideration whether a suggestion is accepted or refused.

level 7: The process is automatically performed, and the result is reported afterwards. level 8: The process is automatically performed, and the result is reported at request only level 9: The process is automatically performed, and the result is reported only when required.

level 10: The process is automatically performed completely.

The selection level generation unit 21 generates the automation level selection frame 11 by selecting one or more automation levels required for the operation performed by the operation performing system from a plurality of automation levels listed in the basic level selection frame shown in FIG. 4A. In this example, the selection level generation unit 21 generates the automation level selection frame 11 as shown in FIG. 4B by selecting the automation levels 1, 5 through 10 from among the automation levels 1 through 10 at an instruction from the system developer or the user, and by rejecting the automation levels 2 through 4. It is optionally determined which automation level is to be selected from the basic level selection frame to generate the automation level selection frame 11. In addition, the automation level not listed in the basic level selection frame can be set in the automation level selection frame 11 as necessary.

Then, the level-based process generation unit 22 specifies an actual process to be assigned to each automation level in the automation level selection frame 11 generated by the selection level generation unit 21 corresponding to the contents of the operation performed by the operation performing system and the item reported in the operation (step S12).

FIG. 5 shows the function of the level-based process generation unit 22. The level-based process generation unit 22 determines a target process based on the operation performed by the operation performing system for each automation level set in the automation level selection frame 11. As the information identifying a process corresponding to each automation level, the level-based process generation unit 22 outputs an address (or a pointer) at which the program describing the process is stored. This information is written to the automation level selection frame 11. Thereby, the respective processes are linked to the plurality of automation levels set in the automation level selection frame 11.

FIGS. 6A and 6B show examples in which level-based processes are assigned to respective automation levels. FIG. 6A shows an example in which there is one candidate for a level-based process to be assigned to each automation level. FIG. 6B shows an example in which there are a plurality of candidates for some level-based processes to be assigned to each automation level (for example, a case in which a branch process is included).

Assuming that a process A is required by the operation performing system to perform an operation K, and that the contents of the report about the process A are X, for example, the level-based process as shown in FIG. 6A is assigned to each automation level corresponding to the operation K. In this example, the process A is, for instance, a process of determining a route from the current point to the destination point. In addition, the contents X of the report are, for example, a message "The process A has been performed", and depends on a performed process.

- level 1 (All processes are performed by a user.): No processes are performed.
- level 5 (The best suggestion is performed with approval.): The process A is presented with confirmation, and is performed if approved.
- level 6 (Time is allowed for considering whether the suggestion is accepted or refused.): The process A is presented, and is performed when no answer of approval or refusal is received.
- level 7 (The process is automatically performed, and the result is reported afterwards.): The process A is performed, and then the contents X of the report are represented.
- level 8 (The process is automatically performed, and the result is reported at request only.): The process A is performed, and then the contents X of the report are represented on request.
- level 9 (The process is automatically performed, and the result is reported only when required.): The process A is performed, and then the contents X of the report are represented when they are determined to be required.
- level 10 (The process is automatically performed completely.): The process A is performed.

When there are a plurality of candidates for processes (processes A, B, and C) presented for an operation, and the contents of the report about the process are X, a level-based process is assigned, for example, as shown in FIG. 6B. Assume that the best suggestion among the processes A, B, and C is the process A.

- level 1 (All processes are performed by a user.): No processes are performed.
- level 2 (A substitute suggestion is presented.): The processes A, B, and C are presented.
- level 3 (A few selected substitute suggestions are presented.): The processes A and C are presented.
- level 4 (The best suggestion is presented.): The process A is presented.
- level 5 (The best suggestion is presented with approval.): The process A is presented with confirmation, and is performed if approved.
- level 6 (Time is allowed for considering whether the suggestion is accepted or refused.): The process A is presented, and is performed when no answer of approval or refusal is received.
- level 7 (The process is automatically performed, and the result is reported afterwards.): The process A is performed, and then the contents X of the report are represented.
- level 8 (The process is automatically performed, and the result is reported at request only.): The process A is performed, and then the contents X of the report are represented on request.
- level 9 (The process is automatically performed, and the result is reported only when required.): The process A is performed, and then the contents X of the report are represented when they are determined to be required.
- level 10 (The process is automatically performed completely.): The process A is performed.

FIG. 7 shows a practical example of the automation level selection frame and a corresponding level-based process performed when a route setting operation is performed in a car navigation system as an example of a plurality of process candidates for a single operation. In setting a route in a car navigation system, for example, the following level-based process can be assigned to each automation level.

- level 1: The authority for an operation is passed to a user. Since all processes are left to the user, the system performs nothing.
- level 2: All possible destinations are listed. The user sets actual destinations.
- level 3: The destinations are automatically limited to a predetermined number depending on the type of user, the environment, etc., and then are presented to the user. The user selects and set a desired destination from among the presented destinations.
- level 4: The best suggestion of selected destinations is presented to the user depending on the type of user, the environment, etc. If the user accepts the suggestion, then the user sets a desired destination from among the presented destinations.
- level 5: The best suggestion of selected destinations is presented to the user depending on the type of user, the environment, etc., and the user is asked whether or not any of the destinations are to be set. If the user accepts the suggestion, the system automatically sets a route with the destinations.
- level 6: The best suggestion of destinations is determined, and the user is suggested, for example, "Is it acceptable to set a route with . . . (specifying the determined destination) ?" The user is allowed to take a predetermined time to determine whether the suggestion is to be accepted or refused. If the user accepts the suggestion, the suggested route to the destination is set. If the user does not accept the suggestion, then the suggestion is deleted.

level 7: The best suggestion of destinations is determined, and a route is automatically set with the destinations. Then, the report that "The route has been set with . . . (specifying the determined destination." is presented.

level 8: The best suggestion of destinations is determined, and a route is automatically set with the destinations. The report is issued on request.

level 9: The best suggestion of destinations is determined, and a route is automatically set with the destinations. The report is issued only when it is determined that the report is required. For example, if a suggested place is common to the user, that is, if the user daily visits the place, no reports are issued. However, the report is issued if the place is new to the user, that is, if the place is, for example, never visited by the user.

level 10: The best suggestion of destinations is determined, and a route is automatically set with the destinations. No reports are issued to the user.

Relating to the "trigger operation" performed when the automation level selection frame 11 is used, a trigger refers to, for example, "a user getting on a car", and an operation refers to, for example, "setting a route". The automation level selection unit 10 selects an automation level from the automation level selection frame 11 shown in FIG. 7 when the user gets on the car as described later in detail, and the level-based process control unit 2 controls a process corresponding to the selected automation level. An embodiment of the method of selecting an automation level is described later.

Figure 8:
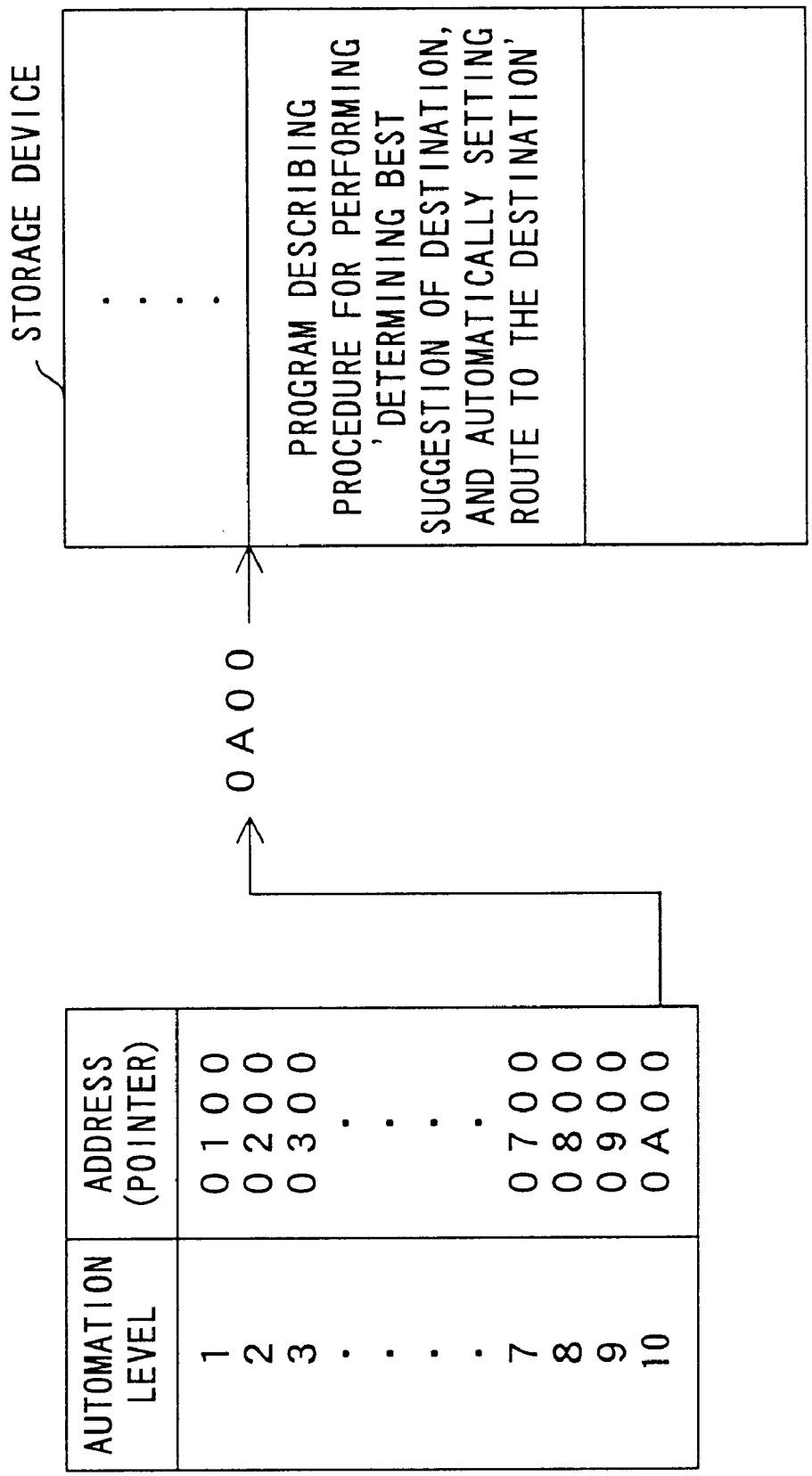
FIG. 8 shows the method of assigning a process corresponding to each automation level.

FIG. 8 shows the method of assigning a process corresponding to each automation level. The program describing the process performed by the operation performing system is stored in, for example, a storage device provided in the operation performing system. When a corresponding process is assigned to each automation level set in the automation level selection frame 11, the storage address (or a pointer) of the program describing the process corresponding to each automation level is linked.

Thus, when the operation performing system performs an operation, and the automation level selection unit 10 selects an automation level, the operation performing system can invoke and execute a program describing a process corresponding to the selected automation level.

In FIG. 9, as a practical example of a case in which only one process is performed for an operation, when a user is headed for a destination, and a preliminarily entered user's favorite shop resides near the route, an operation of changing (or not) the predetermined route is described below. This example is based on a car navigation system capable of performing a rerouting process.

level 1: The user is notified that "the user's favorite shop has been found". Rerouting is set by the user.

level 5: The user is notified that "the user's favorite shop has been found". The user is asked whether or not the user will visit the shop. If the user agrees to visit, then the system automatically reroutes the way to include the shop.

level 6: The user is notified that "the user's favorite shop has been found, and the system is ready to reroute the way to include the shop". Predetermined time is allowed for considering whether the suggestion is accepted or refused. If the user accepts the suggestion, the system reroutes the way. If the user refuses the suggestion, the system takes no action.

level 7: After automatically rerouting the way to include the user's favorite shop, the system issues to the user the report that "the rerouting process has been performed to include the shop".

level 8: After automatically rerouting the way to include the user's favorite shop, the system issues no report to the user. Only when the user requests the report, the system informs the user that "the user's favorite shop has been found and the rerouting process has been performed to include the shop".

level 9: After automatically rerouting the way to include the user's favorite shop, the system issues to the user the report that "the rerouting process has been performed to include the shop" only when the system determines that the report is required. The system can determines whether or not it is necessary to notify the user of the rerouting using the knowledge base 13. For example, the system dose not issue a report about rerouting in case of avoiding traffic congestion, however, it issues the report in a case that rerouting is performed due to the user's favorite shop.

level 10: After automatically rerouting the way to include the user's favorite shop, the system issues no report to the user.

When the operation performing system recognizes that the user has come near the user's favorite shop, the automation level selection unit 10 selects an automation level from the automation level selection frame 11 shown in FIG. 9, and the level-based process control unit 2 controls the operation of the level-based process corresponding to the automation level. An embodiment of the method of selecting an automation level is described later.

FIG. 10 shows an operation of setting a destination and a place to be included in the route when a car navigation system set a route as a practical example of a case in which any item is set in the operation performing system. In this example, an automation level is selected from a basic level selection frame different from the above described basic level selection frame.

level 11 (All processes are performed by a user.): The authority for an operation is passed to a user.

level 12 (The user is prompted to make settings for respective processes): The user is prompted to set a destination, and then set a place to be included in the route. Thus, all steps of setting necessary items are sequentially presented to and set by the user.

level 13 (The user is prompted to make a setting, and other settings are automatically made by the system.): The user is prompted to set a destination, and then a place to be included in the route is automatically set by the system.

level 14 (A setting is automatically made with the user's approval.): The system automatically sets a destination and a place to be included in the route, and then obtains the user's approval.

level 15 (The process is automatically performed completely.): The system automatically sets a destination and a place to be included in the route.

FIG. 11 shows the process of setting a parameter in searching a route in a car navigation system as a practical example of a case in which a parameter is set for a system. In this embodiment, a trigger refers to an "instruction from the user to search the route" or the "necessity of rerouting the way due to traffic congestion, etc.", and so on. On the other hand, an operation refers to "setting a parameter to search the route".

Various parameters are used in searching the route. As a parameter used in searching the route can be a common road by priority, a required time by priority, a required fee by priority, etc. The search result may depend on an amendment made to any of these parameters.

If the above described trigger is given to a car navigation system, the automation level adjustment apparatus first generates the automation level selection frame 11 to select an automation level of the route searching operation, and then assigns a level-based process to each automation level as shown in FIG. 11.

level 11 (All processes are performed by a user.): The authority for an operation is passed to a user. The settings of conditions are all left to the user, and the system takes no action. At this time, a route cannot be searched unless the user has set all conditions.

level 12 (The user is prompted to set each process.): The user is prompted to set necessary parameters such as a searching condition, etc. in searching the route, and all steps of setting necessary items are sequentially presented to and set by the user.

level 13 (The user is prompted to make a setting, and other settings are automatically performed by the system.): Some of the parameters necessary in searching the route such as a searching condition, etc. are automatically set by the system, and others, as necessary, are presented to and set by the user.

level 14 (An item is automatically set with the user's approval.): The best suggestion of the parameters necessary in searching the route such as a searching condition, etc. is presented to the user to obtain the user's approval.

level 15 (The process is automatically performed completely.): The system automatically selects the best suggestion of, for example, a searching condition, etc. required to search a route, and issues no report to the user.

As described above, when a trigger is given to the operation performing system, the automation level adjustment apparatus generates the automation level selection frame 11. In the automation level selection frame 11, each automation level is assigned a corresponding process. When one automation level is selected in the process described later, the level-based process control unit 2 instructs the operation performing system to perform a level-based process corresponding to the selected automation level. The correspondence between each automation level and a level-based process can be managed by a pointer to a predetermined procedure (subprogram) of processes S-1, S-2, . . . , S-n, or can be realized by being collectively represented in a program.

2. Automation Level Selection Unit

The automation level selection unit 10 determines which automation level is to be selected when an operation is performed by the operation performing system. An automation level is selected by one of or a combination of the following methods of selecting an automation level based on (1) situation judgement, (2) performance measurement/prediction result, (3) user reaction information, and (4) user operation record.

(1) Selection Based On Situation Judgement

The knowledge base 13 describes rules, etc. for selecting an automation level depending on a condition of, for example, information about user, information about the operation performing system, information about environment, etc.

FIGS. 12A and 12B show examples of the rules described in the knowledge base 13. The example shown in FIG. 12A indicates "information has received" as a trigger, and "the information is presented (displayed)" as an operation corresponding to the trigger. The knowledge base 13 describes the rule that "if the user is a man, an automation level 10 (display in a completely automatic process) is selected, and if the user is a woman, an automation level 5 (display after an inquiry as to display or no-display)" is selected.

The example shown in FIG. 12B indicates "new software has been found" as a trigger, and "the new software is installed" as an operation corresponding to the trigger. The knowledge base 13 describes the rule that "if the new software is desired by the user, then the automation level 5 (the information is provided for the user and the software is installed if the user approves) is selected, and if it is a bug-fix, then an automation level 7 (the software is automatically installed, and then it is informed to the user)" is selected.

The rule stored in the knowledge base 13 is input and edited by the user. In addition, knowledge can be input to the knowledge base 13 or amended based on the user's record (history) of the operations in the past. When the same automation level is repeatedly selected for a specific trigger-operation relationship, the knowledge base 13 is amended such that a higher automation level can be selected for the trigger. These processes are performed by the knowledge base edition unit 18.

When the user sets the knowledge base 13, the conditions are described using, for example, an "if statement" as shown in the examples in FIGS. 12A and 12B. The conditions can be directly input by the user, or the user can select an item from a predetermined menu. Furthermore, a desired automation level can be set using 'then'.

The user's liking is diversified, and the desired extent of an automation level of an operation to be performed by the operation performing system depends on each user. Therefore, it is recommended that the automation level of an operation performing system is customized for each user. However, an operation performing system is frequently used by a plurality of users, and a user frequently uses a plurality of operation performing systems. Therefore, it is hard to customize an operation performing system for each user.

To solve the above described problem, the knowledge base 13 can be stored in a portable storage medium such as an PC card, etc. Thus, each user can carry the knowledge base 13 with him or her, and an operation can be performed in any system at a specific automation level by inserting the PC card in a system, etc. to which the automation level adjustment apparatus is applied. Practically, the knowledge base 13 generated when a car navigation system is used is recorded on the PC card, etc. Then, if the user carries the PC card with him or her, the operation at the automation level based on the obtained knowledge base 13 can be realized even when the user uses another car navigation system. In this case, the knowledge base 13 can be commonly used for any car navigation system of any car navigation system manufacturer, without limiting to a specific car navigation system manufacture, by sharing the structure of the knowledge base 13 and an input/output interface.

When the situation judgement unit 12 obtains the current situation, it obtains situation data from a situation observation device not shown in the attached drawings, and accesses the knowledge base 13 using the situation data as a key. Then, an automation level is selected from the automation level selection frame 11 based on the rule described in the knowledge base 13.

It is not necessary to design the situation observation device as a part of the situation judgement unit 12, but the device can be provided external to the automation level adjustment apparatus, or the operation performing system. The situation judgement unit 12 uses the situation data after obtaining it from the situation observation device. The situation data is not specifically limited, but can be the age and gender of the user, the temperature, weather, season, etc.

Figure 13:
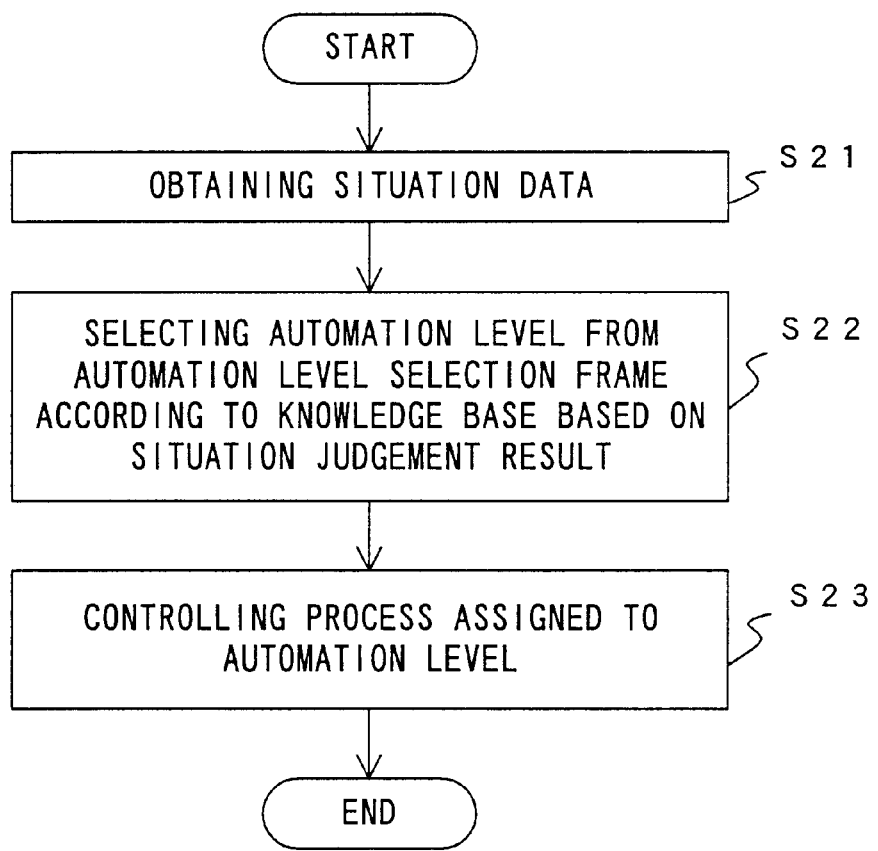
FIG. 13 is a flowchart of the process of adjusting the automation level based on the situation judgement.

FIG. 13 is a flowchart of the process of adjusting an automation level based on a situation judgement. The situation judgement unit 12 obtains situation data (step S21), and accesses the knowledge base 13 using the situation data. The situation judgement unit 12 selects an automation level from the automation level selection frame 11 according to the rule described in the knowledge base 13 (step S22). Afterwards, the level-based process control unit 2 controls the process corresponding to the selected automation level (step S23).

For example, when the rule shown in FIG. 12A is described in the knowledge base 13, the automation level selection unit 10 outputs "automation level=5" by accessing the knowledge base 13 when the situation judgement unit 12 detects that the user is a woman. Then, the level-based process control unit 2 recognizes a process corresponding to "automation level=5" from the automation level selection frame 11, and instructs the operation performing system to perform the process.

FIG. 14 is a flowchart of the process of the level-based process control unit. When the level-based process control unit 2 receives an automation level from the automation level selection unit 10, the level-based process control unit 2 controls the process corresponding to the automation level.

The automation level received from the automation level selection unit 10 is analyzed (step S100). If it refers to "the automation level 1 (the authority for an operation is passed to a user)", then the authority for an operation is passed to the user (step S101), and the user performs all operations completely manually. If it refers to "the automation level 5 (with permission (the best suggestion is realized with approval))", then the user is asked whether or not the operation is automatically performed (step S102), and the user determines whether or not the operation is automatically performed (step S103). If an automatic operation is specified, a level-based process corresponding to the automation level 5 is performed (step S104). If it is not specified, then, the authority for an operation is passed to the user (step In the case of the automation level 6 (Time is allowed for consideration whether the suggestion is accepted/refused.), the user is allowed to take time in refusing the suggestion (step S105) to determine whether or not the user accepts or refuses the suggestion within a predetermined time (step S106). When the user refuses the suggestion, the authority for an operation is passed to the user (step S101). When the user accepts the suggestion, a level-based process corresponding to the automation level 6 is performed (step S107).

In the case of the automation level 7 (The process is automatically performed, and then it is informed to the user.), a level-based process corresponding to the automation level 7 is performed (step S108), and the user is informed the process has been performed (step S109). Similarly, corresponding level-based processes are performed for the automation levels 8 and 9. In the case of the automation level 10 (The process is performed completely automatically.), a corresponding process is completely automatically performed, and no report is issued to the user (step S112).

(2) Selection Using Measurement/Prediction Result of Performance

When an automation level is selected, it is desired that the highest performance (in processing time, precision, etc.) is obtained. Then, the automation level adjustment apparatus according to the present embodiment preliminarily analyzes the relationship between the extent of the participation of the user for an operation and the resultant performance, and selects an automation level using the analysis result. For example, if the analysis result such as "when the operation performing system is operated at automation level=4, and the user intervenes in the operation of the operation performing system at the operation environment, the analysis result of the process speed=100 ms and process precision=70%" is obtained for each automation level, then an automation level is selected such that the process evaluation function F (speed, process, . . . ) is the optimum function.

The performance prediction unit 14 measures/predicts the performance of the user or the system when the operation performing system performs an operation, and selects an automation level from the automation level selection frame 11 according to the measurements or predictions. The performance can be the processing time, the precision of a process, the reflection of a user Is intention, etc. The processing time is measured using a clock. The precision of a process is determined based on, for example, whether or not the route set by the system is appropriate in a car navigation system. The reflection of a user's intention is determined based on whether or not the route set by the system has been changed by the user.

The performance prediction unit 14 can be designed using a performance database for storing data simply about performance. In this case, the performance database can be generated using an actual value measured for each automation level in the past.

The function of obtaining the measured/predicted data of performance does not have to be necessarily designed as a part of the performance prediction unit 14. If it is an external function of the automation level adjustment apparatus, the performance prediction unit 14 obtains data therefrom.

Figure 15:
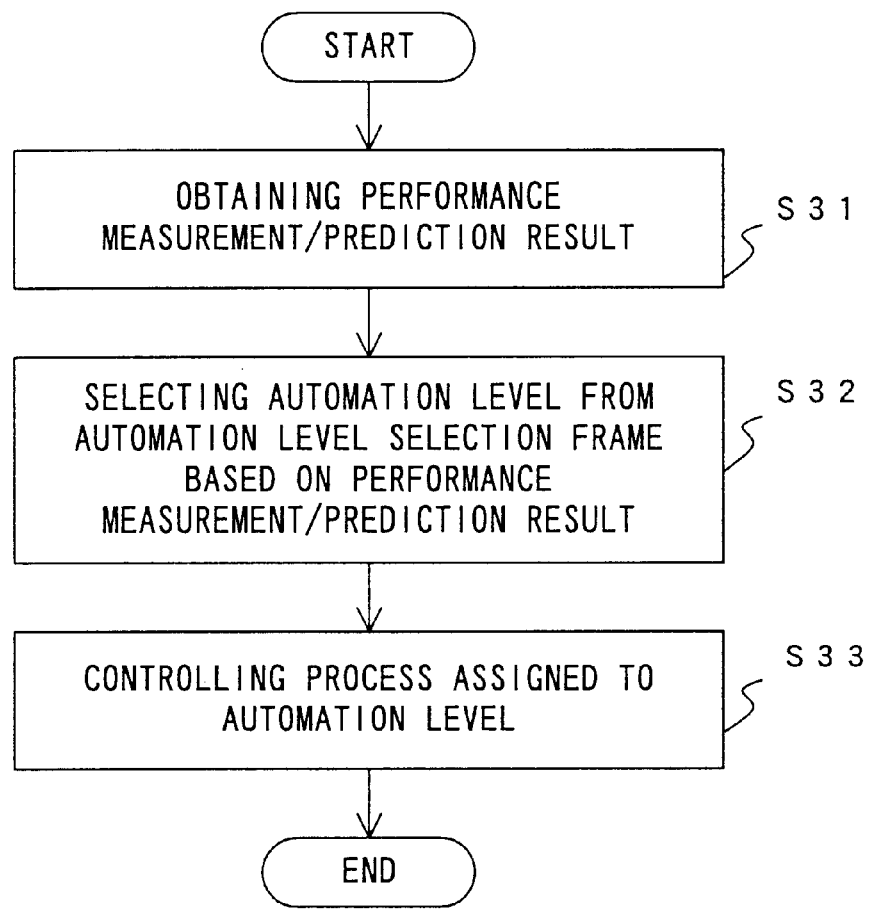
FIG. 15 is a flowchart of the process of adjusting an automation level based on the performance measurement and estimation result.

FIG. 15 is a flowchart of the automation level adjustment apparatus based on the performance measurement/prediction result. The performance prediction unit 14 obtains a performance measurement/prediction result (step S31). Based on the obtained result, an automation level is selected from the automation level selection frame 11 (step S32). Then, the level-based process control unit 2 controls the process corresponding to the selected automation level (step S33).

In the above described process, when performance is newly measured, the measurement result is used in the subsequent processes in which an automation level is selected. When performance is predicted, it can be used in selecting an automation level at that time.

(3) Selection According To User Reaction Information

If a user reaction indicates a "request for a more automatic operation" and on the other hand a "request to stop an automatic operation", then it is necessary to change the automation level into a user-requested level.

The user response detection unit 15 detects the reaction of a user when the operation performing system is performing an operation at a specific automation level, and determines an automation level to be selected next time when the same operation is performed, based on the reaction and the values of the automation levels in one or more previous processes stored in the past selection level holding unit 17.

As a method of detecting the reaction of a user, for example, a method of analyzing the words of the user and the sound of disagreeableness, a method of analyzing the complexion and expression of the user, and a method of analyzing the sound and tone of the voice of the user. In the present embodiment, it is discriminated only as to whether the reaction of the user is positive or negative. That is, no strict analysis about the user's reaction is required. It is not necessary that the function of obtaining the user reaction information is designed as a part of the user response detection unit 15. When it is provided as an external function of the automation level adjustment circuit, the user response detection unit 15 obtains the information therefrom.

FIG. 16 is a flowchart of the process of determining an automation level according to the user reaction information. In addition, it is assumed that the user response detection unit 15 has the function of detecting a user reaction. Furthermore, it is assumed that the past selection level holding unit 17 stores information that the automation level=2 was selected in the immediately previous operation, and information that an average value of the automation level selected in the past is 4.

The reaction of the user to the current automation level (=2) is detected (step S41). It is determined whether or not the user reaction is positive (step S42). If the user reaction is not positive, it is determined whether the current automation level is higher than an average automation level (=4)(step S43). If the current automation level is higher than an average automation level, then the current automation level is lowered (step S44). If the current automation level is not higher than the average automation level, then the current automation level is raised (step S45). For example, it is raised up to the automation level=6. If the determination in step S42 indicates that the user reaction is positive, then the automation level is kept as is (step S46). This process is only an example. A more appropriate automation level can be selected in consideration of not only the automation level selected in the previous process but also the automation levels in the process before the previous process.

(4) Selection Using User Operation Record

The user operation record determination unit 16 stores operation information about how the user is involved in the process performed at a specific automation level, and, according to the operation information, determines an automation level to be selected next time when the same operation is performed. The record of the user operation information includes the action of the user in the process performed at a specific automation level, such as pressing a button or something.

For example, if a report that "the operation performing system has automatically performed a specific operation" has been presented to the user, and the user immediately deleted the report message, then it can be considered that the user must have thought the report unnecessary. According to the present embodiment, when the user repeats an operation of deleting a report message for a specific operation, an automation level is selected such that a report about the similar operation performed next time can be suppressed. In addition, when the user always performs a series of operations, an automation level is selected such that the series of operations can be automatically processed.

If a route searching process is performed in a car navigation system, and the user repeatedly inputs the same destination, the same place to be included in the route, and the same searching condition for a series of operation of searching a route with a place to be included in the route set after setting the destination, then the automation level adjustment apparatus gradually raises the automation level. For example, the user first sets necessary items manually. In the next operation, an operating procedure is presented. Then, in the next operation, when the user sets a destination, an automation level in which the place to be included in the route and the searching condition are automatically set by the system is selected. Then, in the next same operation, the system automatically sets all items with the user's approval. Finally, the system automatically sets all items, and no reports are issued to the user.

FIG. 17 is a flowchart of the process of determining an automation level based on the record of user operation. The user operation record determination unit 16 stores the record of the operation in which the user is involved in the operation performed by the operation performing system (step S51). Then, the current operation record is compared with the previous operation record (step S52). It is determined whether or not the current operation record is the same as the previous operation record (step S53). If the current operation record is the same as the previous operation record, then the automation level for the operation is raised by 1 (step S54). If the current operation record is not the same as the previous operation record, then the automation level of the operation is kept as is (step S55).

The automation level selection unit 10 can be designed as comprising at least one of the situation judgement unit 12, the performance prediction unit 14, the user response detection unit 15, and the user operation record determination unit 16. It is not necessary to include all of them in the automation level selection unit 10.

3. Management Unit

When an operation is realized by performing a plurality of processes, it is recommended that an automation level is set for each process. It is convenient if automation levels are adjusted for a series of operations depending on utilization state of the user; such that, the same automation level is collectively set for each process such that the user is asked in each process, or the different automation levels are set for each process.

In addition, it is also convenient if an automation level for each "trigger-operation relation" can be put in a group for each type of application, or if automation levels can be generally managed depending of the situation. Furthermore, when a system is shared among a plurality of users, it is convenient to set different automation levels of an operation for each user.

The management unit 3 manages a plurality of automation level adjustment units 1 provided for each operation when an automation level is set for each operation step of an operation sequence including a plurality of operations for one trigger. Furthermore, the management unit 3 manages a plurality of automation level adjustment units 1 provided for different operations for each trigger. Additionally, the management unit 3 generally manages a plurality of automation levels selected by a plurality of automation level adjustment units 1. For example, in a case that an operation sequence comprising a plurality of operations is started by a single trigger, each operation is performed at the same automation level. The management information, etc. is stored in a management database 31. The management of sharing, individualizing an automation level for each automation level adjustment unit 1 can be realized by, for example, managing the assignment of the automation level selection frame 11 for each automation level adjustment unit 1.

Figure 18:
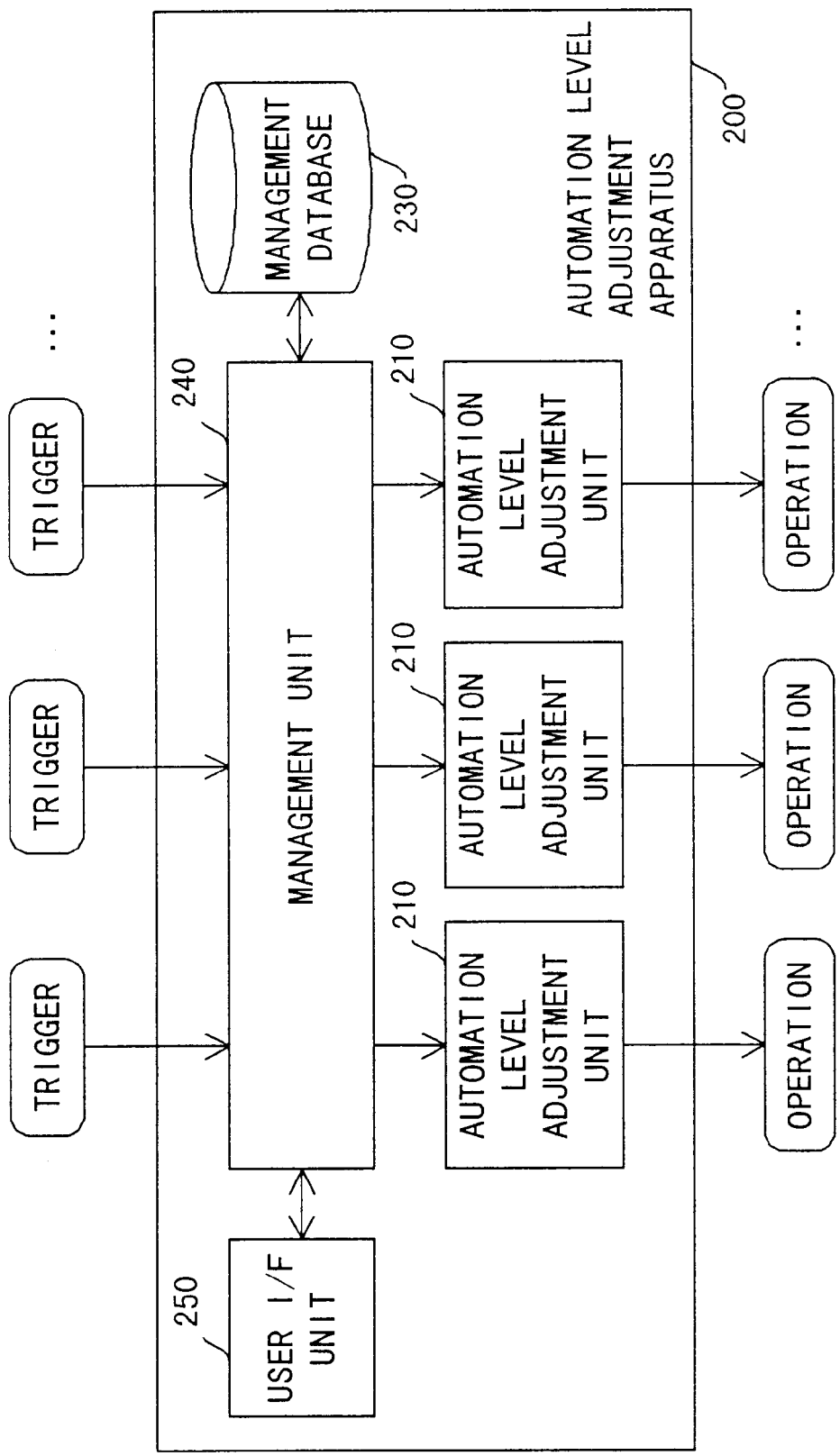

FIGS. 18 and 19 show examples of the configurations of the automation level adjustment apparatus provided with a management unit.

With the configuration shown in FIG. 18, an automation level adjustment apparatus 200 comprises a management unit 240, a management database 230, and a plurality of automation level adjustment units 210. The management unit 240 manages the plurality of automation level adjustment units 210 for performing an operation on various triggers. When the automation level adjustment units 210 are generally managed, the management unit 240 is designed for management of any of the trigger-to-operation ratios of 1 to 1, 1 to n (n>=2), m to 1 (m>=2), and m to n.

With the configuration shown in FIG. 19, an automation level adjustment apparatus 300 comprises a management unit 340, a management database 330, and a plurality of automation level adjustment units 310. The management unit 340 manages a corresponding automation level adjustment unit 310 for each operation step of the operation sequence comprising a plurality of operations for one trigger.

Figure 20:
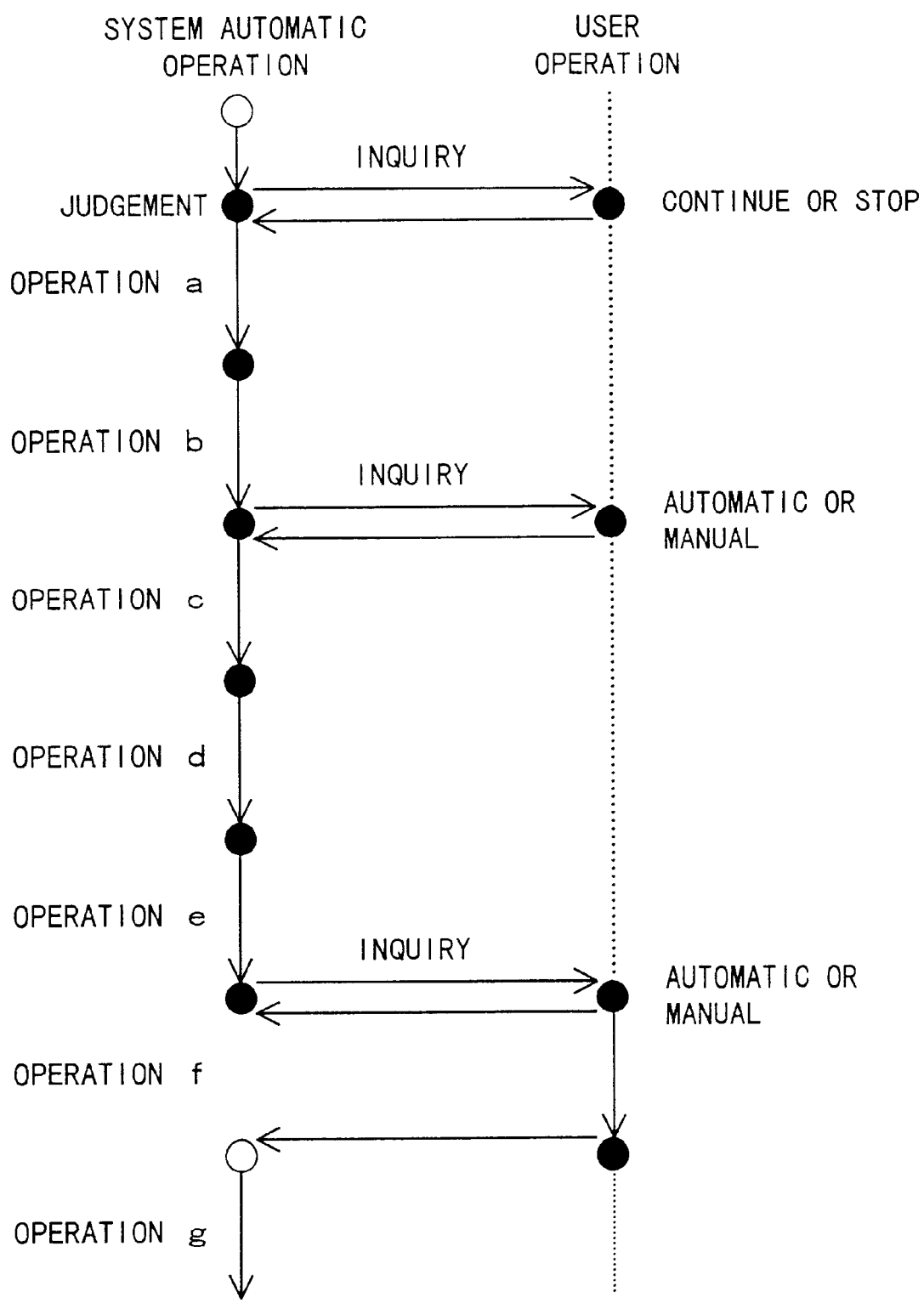
FIG. 20 shows an example of setting an automation level in the operation sequence containing a plurality of operations for one trigger.

FIG. 20 shows an example of adjusting automation levels by corresponding automation level adjustment units 310 for each operation step of the operation sequence comprising a plurality of operations for one trigger.

When an operation sequence comprises a series of operations a through g, the management unit 340 instructs the automation level adjustment unit 310 corresponding to each operation to adjust each automation level. That is to say, each of the automation levels for the operations a through g is adjusted by each automation level adjustment apparatus 310. In the example shown in FIG. 20, the user is asked whether the operation is continued or stopped for the operation a, and the operation a is performed if the user specifies "continuing". The operation b is automatically performed by the system completely. The user is asked whether the operation c is to be performed automatically or manually, and the operation c is automatically performed when the user answers "automatically". The operations d and e are performed completely automatically. The user is asked whether the operation f is to be performed automatically or manually. In this example, the user selects "manually", and the user manually performs the operation f. In this case, the system does not perform the operation f at all. In addition, the operation g is performed completely automatically.

An automation level can be adjusted for the entire system or for each operation step. In addition, a system capable of managing a user can adjust an automation level for each user. Furthermore, different automation levels can be set for each of a series of operations, and the same automation level can be set for all of a series of processes. The management unit 3 can generally manage the settings of automation levels, and controls the adjustment by the automation level adjustment unit 1.

As described above, an embodiment of the present invention applied mainly to a car navigation system has been explained. However, the present invention is not limited to a car navigation system, but can also be applied to all devices having automatic processing functions such as a computer, a robot, an information presentation apparatus, an automatic machine, domestic electric appliances, etc.

For instance, an example of a case in which the present invention is applied to a computer is the automatic upgrading operation for an operating system (OS) and application software, the automatic formatting operation of the software for a word processor, the ticket reserving operation, the hotel reserving operation, etc. Examples as domestic electric appliances can be a video recorder, an electronic range, a washing machine, etc.

FIG. 21 shows an example of an automation level and assigning a corresponding process to the automation level when the present invention is applied to a computer. In this example, a trigger refers to "when software is initially used".

An automation level is selected from the automation level selection frame 11 containing automation levels 1 through 10. Then, a practical level-based process as shown in FIG. 21 is assigned to each automation level.

level 1 (All processes are performed by a user.): The authority for an operation is assigned to a user, and the system takes no action.

level 2 (A substitute suggestion is presented.): A plurality of selection items such as "using anyway", "reading first", "interaction for usage", "viewing a demonstration", etc.

level 3 (Some substitute suggestions are selected.): Some selection items are selected and presented corresponding to the skill level of the user depending on the type of user, environment, etc.

level 4 (The best suggestion is presented.): The best suggestion "viewing a demonstration" is presented corresponding to the skill level of the user depending on the type of user, environment, etc.

level 5 (The best suggestion is performed with approval.): The user is asked whether or not the best suggestion "viewing a demonstration" is performed depending on the type of user, environment, etc. If the user accepts the suggestion, the system automatically performs the best suggestion.

level 6 (Time allowed for considering approval or refusal.): A demonstration file is automatically read, then "A demonstration is starting. OK?" is presented, and the user is allowed a predetermined time for acceptance or refusal. If the user approves, the demonstration is started. Without the user's approval, the suggestion is stopped.

level 7 (An operation is automatically performed, and a report is issued afterwards.): A demonstration file is automatically read to start the demonstration. A report "The demonstration was performed." is issued later.

level 8 (An operation is automatically performed, and a report is issued at a request.): A demonstration file is automatically read to start the demonstration. Only when the user asks what is going on, a report such as "The demonstration is being performed." is issued.

level 9 (An operation is automatically performed, and a report is issued only when it is required.): A demonstration file is automatically read to start the demonstration. A report is issued only when it is required. For example, a report is not issued when an object is easily recognized, but is issued when it cannot be recognized without explanation.

level 10 (An operation is performed completely automatically.): A demonstration file is automatically read to start the demonstration. No reports are issued to the user.

FIG. 22 shows an example of automation levels and processes assigned to respective automation levels when the present invention is applied to a video tape recorder. In this example, a trigger refers to "user's favorite program has been found." In this case, a level-based process corresponding to a specific automation level is performed by selecting the automation level. To make an effective adjustment of the automation level, the user is asked, "If your favorite program is found, record it" Only when the user answers OK, a process corresponding to an automation level is performed on each program.

level 1 (All processes are performed by a user.): Even a user's favorite program is not automatically recorded.

level 5 (The best suggestion is performed with approval.): A user's favorite program is recorded after asking each time the user, "Is the program . . . to be recorded?", and obtaining a positive answer from the user. level 6 (Time allowed for considering approval or refusal.): A user's favorite program is recorded after asking each time the user, "Is the program . . . to be recorded?", allowing a predetermined time for considering approval or refusal, and obtaining a positive answer from the user. Without an answer from the user, the program is not recorded. Otherwise, after asking the user, "Is the program . . . not recorded?", a predetermined time is allowed for approval or refusal. If the user answers, the program is not recorded. If the user gives no answers, the program is recorded.

level 7 (An operation is automatically performed, and a report is issued afterwards.): The system determines to automatically record the program, and then reports, "The program . . . was recorded."

level 8 (An operation is automatically performed, and a report is issued at a request.): The system determines to automatically record the program, and then report, "The program . . . was recorded." when the user asks if any program has been recorded.

level 9 (An operation is automatically performed, and a report is issued only when it is required.): The system determines to automatically record the program, and then reports, "The program . . . was recorded." only when it determines that it is necessary to report to the user that the program was recorded.

level 10 (An operation is performed completely automatically.): A program is automatically recorded without any report to the user.

As described above, according to the present invention, an automation level can be automatically adjusted in a system for performing a corresponding operation according to a trigger. Therefore, the system can be used at the optimum automation level for a user without the user selecting the automation level. As a result, the load on the user can be successfully reduced when the user utilizes the system.

In addition, since an operation environment can be individually realized for each user, a user who finds difficulty in operating a system (a device, a machine, etc.) can be feel familiar with the system, thereby possibly operating the system smoothly with a necessary and sufficient result.

The relationship between an operation performing system and a user (human) has been described in detail in the above described embodiment, but the present invention is not limited to this application, but can also be applied to the relationship between the operation performing system and a computer.

The function according to the present invention is realized by performing a program describing the above described process using a computer. FIG. 23 is a block diagram of a computer for executing the program. The computer also refers to a microcomputer.

A CPU 1001 loads a program describing the above described process from a storage device 1002 to memory 1003. The storage device 1002 is, for example, a semiconductor memory or a hard disk, and stores the above described program. The memory 1003 is, for example, a semiconductor memory, and is used as a work area of the CPU 1001.

A storage medium driver 1004 accesses the portable storage medium 1005 at an instruction from the CPU 1001. A portable storage medium 1005 comprises a semiconductor device (an PC card, etc.), a storage medium (a floppy disk, a magnetic tape, etc.) to and from which information is input and output through a magnetic effect, and a storage medium (an optical disk, etc.) to and from which information is input and output through an optical effect. A. communications control device 1006 transmits and receives data to and from a network at an instruction from the CPU 1001.

Figure 24:
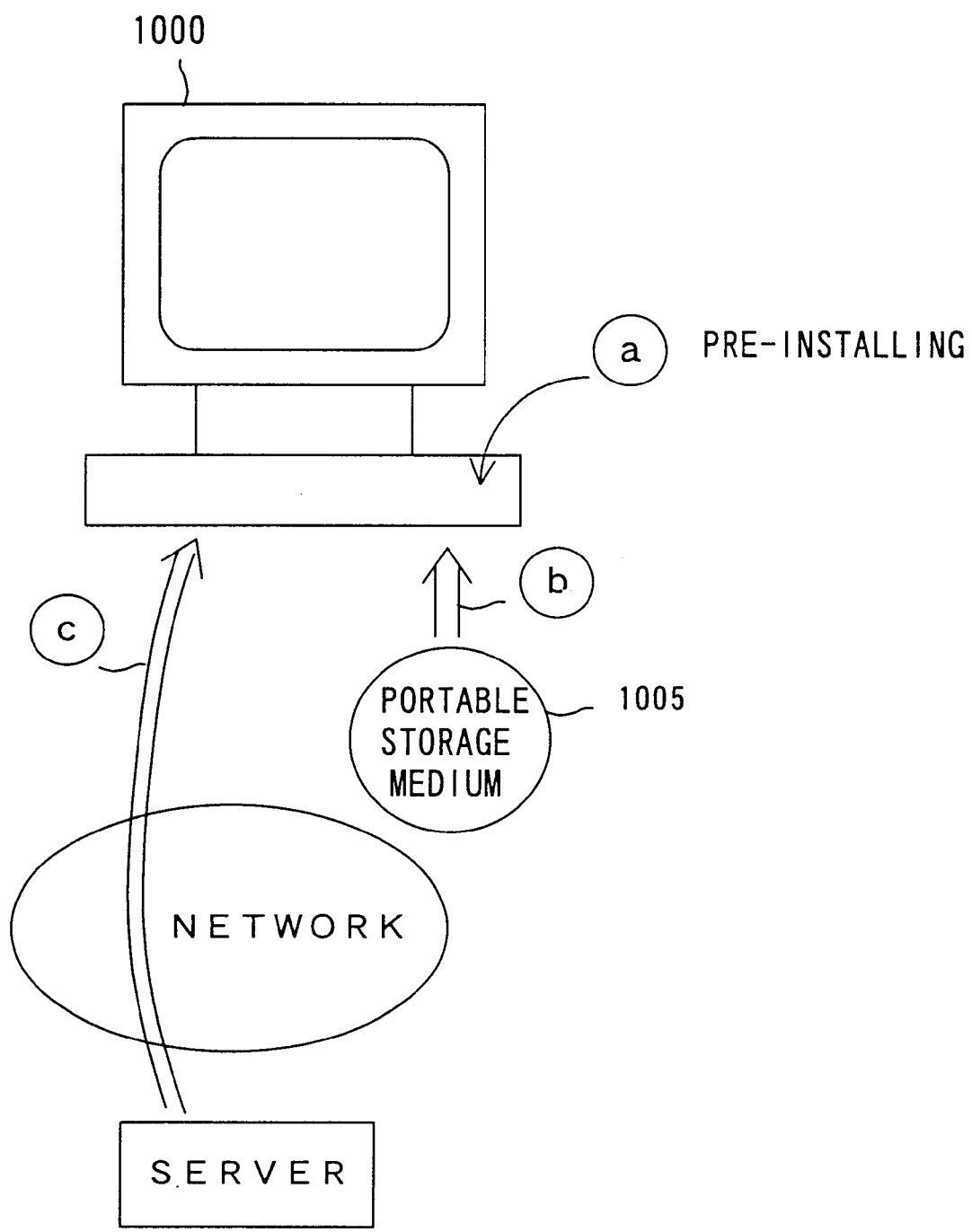
FIG. 24 shows a method of presenting a software program, etc. relating to the present invention.

FIG. 24 shows the method of supplying a software program, etc. according to the present invention. The program according to the present invention is provided by any of the following three methods.

(a) The program is installed in a computer 1000 and presented. In this case, the program, etc. is, for instance, pre-installed before delivery.

(b) The program is provided as stored in a portable storage medium. In this case, the program, etc. stored in the portable storage medium 1005 is basically installed in the storage device 1002 through the storage medium driver 1004.

(c) The program is provided from a server through a network. In this case, the program basically can be obtained by the computer 1000 downloading the program, etc. stored in a server.

What is claimed is:

1. An interaction level adjustment apparatus for use in a system which performs an operation corresponding to a given trigger and for adjusting an interaction level, comprising:

a selector which automatically selects one interaction level, which indicates to what extent the operation is performed through an interactive process between the system and a user of the system, based on a predetermined condition from among a plurality of selectable interaction levels; and a controller which instructs the system to perform a process corresponding to the interaction level selected by said selector.

2. The apparatus according to claim 1, wherein said selector selects one interaction level based on a situation associated with the system.

3. The apparatus according to claim 2, further comprising a knowledge base which describes rules for selecting among the selectable interaction levels based on situations associated with the system, and wherein said selector selects the interaction level from among the selectable interaction levels based on the situation associated with the system according to the rules described in the knowledge base.

4. The apparatus according to claim 3, further comprising:

an editor which describes rules in said knowledge base at an instruction of a user, and edits said knowledge base.

5. The apparatus according to claim 4, wherein said editor obtains rules from said knowledge base based on a history of user operations, and amends said knowledge base.

6. The apparatus according to claim 4, wherein when a specific interaction level is repeatedly selected for a specific operation, said editor amends said knowledge base such that an interaction level higher than the specific interaction level can be selected when the specific operation is next performed.

7. The apparatus according to claim 1, wherein when said system performs a predetermined operation, said selector selects an interaction level from among the selectable interaction levels based on at least one of performance of the system and performance of a user.

8. The apparatus according to claim 1, wherein said selector determines an interaction level to be selected, based on a reaction of a user when the system performs a specific operation at an interaction level, when the specific operation is next performed.

9. The apparatus according to claim 1, wherein said selector determines an interaction level to be selected, based on how a user is involved when a specific operation is performed by the system at an interaction level, when the specific operation is next performed.

10. The apparatus according to claim 1, further comprising a storage which stores an interaction level selection frame in which information about the selectable interaction levels is stored, and wherein said selector selects the interaction level from said interaction level selection frame.

11. The apparatus according to claim 10, further comprising a generator which generates said interaction level selection frame by extracting at least one interaction level which is used in an operation performed by the system from among a plurality of reference interaction levels, and by assigning a process procedure corresponding to each extracted interaction level.

12. An interaction level adjustment apparatus for use in a system for performing an operation corresponding to a given trigger and for adjusting an interaction level, comprising:

a plurality of controllers, each of which selects one interaction level, which indicates to what extent the operation is performed through an interactive process between the system and a user of the system, based on a predetermined condition from among a plurality of selectable interaction levels for corresponding operations, and instructs the system to perform a process corresponding to the selected interaction level; and a manager which manages said plurality of controllers provided for the plurality of operations.

13. The apparatus according to claim 12, wherein said manager generally manages an interaction level selected by said plurality of controllers.

14. An interaction level adjustment apparatus for use in a system for performing an operation corresponding to a given trigger and for adjusting an interaction level of an operation of the system, comprising:

a selector which selects one interaction level, which indicates to what extent the operation is performed through an interactive process between the system and a user of the system, based on a predetermined condition from among a plurality of interaction levels;

a determiner which determines a process corresponding to the interaction level selected by said selector based on the operation performed by the system; and a controller which instructs the system to perform the process determined by said determiner.

15. The apparatus according to claim 14, wherein said plurality of interaction levels are determined based on an operation performed by the system.

16. An interaction level adjustment apparatus for use in a system for performing an operation corresponding to a given trigger and for adjusting an interaction level of an operation of the system, comprising:

a determiner which determines a plurality of interaction levels based on an operation performed by the system;

a linkage unit which links processes to corresponding interaction levels according to the operation performed by the system;

a selector which selects one interaction level, which indicates to what extent the operation is performed through an interactive process between the system and a user of the system, based on a predetermined condition from among the plurality of interaction levels; and a controller which instructs the system to perform the process linked to the interaction level selected by said selector.

17. An interaction level adjusting method for use with a system for performing an operation corresponding to a given trigger and for adjusting an interaction level indicating to what extent the operation is performed through an interactive process between the system and a user of the system, comprising:

automatically determining whether the operation corresponding to the given trigger is to be performed interactively between the system and a user or automatically by the system, based on at least one of a situation related to the system, performance of at least one of the system and the user, a reaction of the user taken when the system performs an operation, and how the user has been involved in the operation performed by the system.

18. An interaction level adjusting method for use with a system for performing an operation corresponding to a given trigger and for adjusting an interaction level indicating to what extent the operation is performed through an interactive process between the system and a user of the system, comprising:

automatically switching interaction levels set for the operation corresponding to the given trigger based on at least one of a situation related to the system, performance of at least one of the system and the user, a reaction of the user taken when the system performs an operation, and how the user has been involved in the operation performed by the system.

19. An interaction level adjusting method for use with a system for performing an operation corresponding to a given trigger and for adjusting an interaction level, comprising:

selecting one interaction level, which indicates to what extent the operation is performed through an interactive process between the system and a user of the system, from among a plurality of interaction levels based on at least one of a situation related to the system, performance of at least one of the system and the user, a reaction of the user taken when the system performs an operation, and how the user has been involved in the operation performed by the system; and instructing the system to perform a process corresponding to the selected interaction level.

20. A computer-readable storage medium storing a program for use in a system for performing an operation corresponding to a given trigger and for adjusting an interaction level by directing a computer to perform a method comprising:

selecting one interaction level, which indicates to what extent the operation is performed through an interactive process between the system and a user of the system, from among a plurality of interaction levels based on at least one of a situation related to the system, performance of at least one of the system and the user, a reaction of the user taken when the system performs an operation, and how the user has been involved in the operation performed by the system; and instructing the system to perform a process corresponding to the selected interaction level.

* * * * *